(12) United States Patent
Kuriyama

(10) Patent No.: US 7,551,424 B2
(45) Date of Patent: Jun. 23, 2009

(54) SOLID ELECTROLYTIC CAPACITOR

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 167 days.

(21) Appl. No.: 10/594,700

(22) PCT Filed: Mar. 30, 2005

(86) PCT No.: PCT/JP2005/006133

§ 371 (c)(1), (2), (4) Date: Sep. 28, 2006

(87) PCT Pub. No.: WO2005/096332

PCT Pub. Date: Oct. 13, 2005

(65) Prior Publication Data

US 2007/0177336 A1   Aug. 2, 2007

(30) Foreign Application Priority Data

Mar. 30, 2004   (JP) .............................. 2004-099435

(51) Int. Cl.
*H01G 9/04* (2006.01)
*H01G 9/145* (2006.01)

(52) U.S. Cl. .................... 361/528; 361/541

(58) Field of Classification Search ......... 361/528–529, 361/532, 523, 541; 29/25.03
See application file for complete search history.

(56) References Cited

U.S. PATENT DOCUMENTS

| | | | |
|---|---|---|---|
| 3,686,535 A * | 8/1972 | Piper et al. .................. 361/529 |
| 4,599,788 A | 7/1986 | Love et al. | |
| 6,351,371 B1 * | 2/2002 | Yoshida et al. .............. 361/528 |
| 6,436,268 B1 | 8/2002 | Melody et al. | |
| 6,816,358 B2 * | 11/2004 | Kida et al. .................. 361/540 |
| 7,016,179 B2 * | 3/2006 | Ando .......................... 361/523 |
| 2003/0218859 A1 | 11/2003 | Yoshida | |
| 2004/0066607 A1 * | 4/2004 | Edson et al. ................ 361/528 |
| 2004/0105218 A1 | 6/2004 | Masuda et al. | |
| 2005/0117280 A1 * | 6/2005 | Audo .......................... 361/523 |
| 2006/0146481 A1 * | 7/2006 | Naito et al. ................. 361/528 |
| 2006/0262488 A1 * | 11/2006 | Naito et al. ................. 361/540 |

FOREIGN PATENT DOCUMENTS

| | | |
|---|---|---|
| JP | 61-51911 | 3/1986 |
| JP | 2001-57319 | 2/2001 |
| JP | 2003-101311 | 4/2003 |
| JP | 2003-142347 | 5/2003 |
| JP | 2003-163137 | 6/2003 |
| JP | 2003-338433 | 11/2003 |
| JP | 2004-518812 | 6/2004 |

OTHER PUBLICATIONS

International Search Report for the corresponding International application WO 2005/096332, mailed Jun. 22, 2005.

* cited by examiner

*Primary Examiner*—Eric Thomas
(74) *Attorney, Agent, or Firm*—Hamre, Schumann, Mueller & Larson, P.C.

(57) ABSTRACT

A solid electrolytic capacitor (A1) includes a first and a second porous sintered bodies (1). Each sintered body (1) is flat, with its thickness being small relative to the width or the length. The first and the second sintered bodies (1) are spaced from each other in the widthwise or lengthwise direction.

20 Claims, 23 Drawing Sheets

SOLID ELECTROLYTIC CAPACITOR

TECHNICAL FIELD

The present invention relates to a solid electrolytic capacitor comprising a porous sintered body made of a metal having a valve function.

BACKGROUND ART

Some solid electrolytic capacitors are used for removing noise generated in a device such as a CPU and also for stabilizing power supply to an electronic apparatus (see patent document 1 cited below). FIG. 25 of the present application shows an example of such solid electrolytic capacitor. The solid electrolytic capacitor X includes a porous sintered body 90 made of a metal material that performs a valve action (such metal is referred to as "valve metal" below). An anode wire 91 is disposed such that a portion thereof intrudes into the porous sintered body 90, and that the remaining portion of the anode wire 91, sticking out of the porous sintered body 90, constitutes an internal anode terminal 91a. On the porous sintered body 90, a conductive layer 92 serving as a cathode is provided. Conductors 93, 94 are electrically connected to the internal anode terminal 91a and the conductive layer 92 respectively, and a portion of the respective conductor exposed out of an encapsulating resin 95 constitutes an external anode terminal 93a and an external cathode terminal 94a for surface mounting. Here, the impedance Z of the solid electrolytic capacitor is expressed by the following formula.

$$Z=\sqrt{(R^2+(1/\omega C-\omega L)^2)}$$ [Formula 1]

($\omega$: $2\pi f$ (f: frequency), C: capacitance, R: resistance, L: inductance)

As is understood from Formula 1, $1/\omega C$ is predominant in a low-frequency region where the frequency is lower than the self-resonance point, whereby an increase in capacitance of the solid electrolytic capacitor X reduces the impedance. In a high-frequency region near the self-resonance point, the resistance R is predominant, and hence it is desirable to reduce the equivalent serial resistance (hereinafter, ESR) of the fixed electrolytic capacitor X. Further, since $\omega L$ is predominant in an ultra-high-frequency region where the frequency is higher than the self-resonance point, it is required to reduce the equivalent serial inductance (hereinafter, ESL) of the solid electrolytic capacitor X.

Recently, there has been a growing demand for a larger capacitance of the power supply. The solid electrolytic capacitor X also need to have a larger static capacitance, and to this end, it is desirable to increase the dimensions of the porous sintered body 90. However, the larger the porous sintered body 90 is, the more difficult it becomes to attain a uniform density for the manufactured sintered body. Unfavorably, nonuniform density leads to difficulty in forming a dielectric layer (not shown) or a solid electrolytic layer (not shown) in the pores of the sintered body 90. Another drawback is that the porous sintered body 90 and the anode wire 91 fail to be securely bonded to each other.

A device such as a CPU with a high-speed clock generates a high-frequency noise containing harmonics components. Higher operation speed and digitization of electronic apparatuses require for a power source capable of exhibiting quick response. The solid electrolytic capacitor X, used in such circumstances, is under a strong requirement to have a minimized ESL. Minimizing the ESL may be attained by employing a plurality of anode wires 91. When the inductance of components such as the conductors 93, 94 is large, however, it is impossible to satisfy the foregoing requirement, and therefore still there is a room for improvement with respect to reducing the ESL of the solid electrolytic capacitor X as a whole.

Patent document 1: JP-A-2003-163137

DISCLOSURE OF THE INVENTION

The present invention has been proposed under the foregoing situation, and its object is to provide a solid electrolytic capacitor capable of achieving both a larger capacitance and a lower ESL.

To achieve the above object, the present invention takes the following technical measures.

A first aspect of the present invention provides a solid electrolytic capacitor comprising a first and a second porous sintered bodies made of a valve metal. Each sintered body is of a flat shape with two principal surfaces. The first and the second sintered bodies are spaced in a predetermined direction perpendicular to the direction in which the two principal surfaces are spaced from each other (for example, widthwise or lengthwise of the respective sintered body).

Such structure allows easily increasing the volume of a plurality of porous sintered bodies included in the solid electrolytic capacitor. In addition, each of the sintered bodies does not need to be made large, which facilitates achieving uniform density of the sintered body. Therefore, the solid electrolytic capacitor is suitable for a larger capacitance, and can be properly used with a larger power source. Also, the dimension of the plurality of sintered bodies in the thicknesswise direction is the same as the thickness of one of the sintered bodies. Accordingly, the solid electrolytic capacitor is prevented from becoming unduly thick. Further, since the sintered bodies are flat, an electrical path in the sintered body is short, whereby the resistance and inductance of the capacitor is reduced.

Preferably, the solid electrolytic capacitor according to the present invention may further comprise a package that collectively seal the first and the second sintered bodies. Such structure prevents the sintered bodies from being unduly distorted and exposed to external air.

Preferably, the solid electrolytic capacitor according to the present invention may further comprise an internal anode terminal electrically connected to one of the first sintered body and the second sintered body, and an external anode terminal electrically connected to the internal anode terminal and exposed from the package.

Such structure allows mounting the thinly formed solid electrolytic capacitor so as to be laid flat on the substrate, for example when implementing the solid electrolytic capacitor on the substrate. The solid electrolytic capacitor thus mounted does not unduly protrude upward from the substrate. Therefore, the electronic apparatus can be effectively made thinner. Also, the electrical path from the substrate to the sintered body provided via the internal anode terminal and the external anode terminal is short. Especially, a portion of the electrical path between the external anode terminal and the internal anode terminal is erected with respect to the substrate. Reducing the size of such erected portion is advantageous in reducing an impedance against an alternating current of a high-frequency region. Consequently, the ESR and ESL of the solid electrolytic capacitor as a whole can be reduced, and the noise removal characteristic in the high-frequency region, as well as the response speed in supplying the power can be improved.

Preferably, the solid electrolytic capacitor according to the present invention may further comprise a dielectric layer and a solid electrolytic layer formed on one of the first sintered body and the second sintered body, an internal cathode terminal electrically connected to the solid electrolytic layer, and an external cathode terminal electrically connected to the internal cathode terminal and exposed from the package. Such structure is advantageous to the surface mounting utilizing the external cathode terminal and the external cathode terminal. Also, the electrical path between the internal cathode terminal and the external cathode terminal is short, which is advantageous in reducing the ESR and ESL.

Preferably, the internal anode terminal may include a first anode rod and a second anode rod projecting in opposite directions from one of the sintered bodies. The projecting direction of the first anode rod intersects with the direction in which the first sintered body and the second sintered body are spaced.

Such structure enables the branching of the current to the first anode rod and the second anode rod, and this is appropriate for reducing the ESR and ESL. If the first anode rod and the second anode rod are disposed so as to be concentrated in a part of the sintered bodies unlike the foregoing structure, the sintered body may incur a crack or local heat generation. According to the present invention, since the first anode rod and the second anode rod are spaced across the sintered body, the above disadvantages are effectively prevented.

Preferably, the solid electrolytic capacitor according to the present invention may further comprise a conductor that electrically connects the first anode rod and the second anode rod. Such structure allows disposing the first and the second anode rod electrically parallel, thereby facilitating reducing the resistance. Also, when the first and the second anode rods are respectively utilized as an input and an output internal anode terminal, thereby constituting a so-called three-terminal type or four-terminal type solid electrolytic capacitor, as will be described, the conductor acts as a bypass through which part of the circuit current runs around the sintered bodies. For example, when the bypass electrical path is formed with a low resistance, the DC component of the circuit current can be selectively led to the bypass thus suppressing heat generation in the respective sintered bodies, while supplying the AC component of the circuit current to the sintered bodies, thus effectively removing a noise in the high-frequency region.

Preferably, the conductor may include an anode metal plate fixed to a lower surface of the respective sintered bodies via an insulator. Such structure allows forming the anode metal plate in a flat shape without a stepped portion, thereby reducing the inductance between the first anode rod and the second anode rod.

Preferably, at least part of the anode metal plate may constitute the external anode terminal. Such structure enables reducing the distance between the anode rod and the external anode terminal. Therefore, the path of the current running between the anode rod and the external anode terminal is short, which is advantageous in reducing the inductance of the path.

Preferably, the solid electrolytic capacitor according to the present invention may further comprise a cathode metal plate interposed between the respective sintered bodies and the insulator, and including a portion that constitutes the internal cathode terminal and the external cathode terminal, respectively. Such structure allows, in the manufacturing process of the solid electrolytic capacitor, forming the anode metal plate, the insulator, and the cathode metal plate as an integral component, and collectively bonding, after forming the sintered bodies, the integral component and the sintered body. Accordingly, the manufacturing process of the solid electrolytic capacitor is simplified. Also, the resistance and inductance of the electrical path on the cathode side of the solid electrolytic capacitor is reduced.

Preferably, the conductor may include a metal cover that covers at least part of the respective sintered bodies. Such structure enables protecting the respective sintered bodies with the metal cover. The metal cover is mechanically stronger than, for example, a resin cover. Accordingly, even though heat is generated in the sintered body, the entirety of the solid electrolytic capacitor can be prevented from becoming unduly distorted. Also, since the metal cover is superior to the resin cover in heat conduction, the metal cover is more appropriate for dissipating the heat generated in the sintered body.

Preferably, the solid electrolytic capacitor according to the present invention may further comprise two metal plates made of a valve metal respectively supporting the first and the second sintered bodies, and an anode metal plate to which the metal plates are connected. At least part of the anode metal plate constitutes the internal anode terminal. Such structure allows bonding via a larger joint area the sintered body and the metal plate made of a valve metal, as well as the metal plate made of a valve metal and the anode metal plate, respectively. Therefore, the resistance and inductance between the anode metal plate including the anode rod and the sintered body is reduced, and hence the ESR and ESL of the solid electrolytic capacitor are effectively reduced.

Preferably, each of the sintered bodies may include an upper layer portion and a lower layer portion, and the upper layer portion has higher density than the lower layer portion. Such structure allows increasing the static capacitance per unit volume of the upper layer portion, which is beneficial for increasing the capacitance of the solid electrolytic capacitor. Also, the lower layer portion does not have to have high density. Accordingly, the lower layer portion can be made of a material suitable for being bonded to the upper layer portion and the metal plate respectively. Consequently, imperfect adhesion of those components can be prevented, and the resistance and inductance can be reduced.

Preferably, at least part of the anode metal plate may constitute the external anode terminal. Such structure is advantageous in reducing the resistance and inductance between the internal anode terminal and the external anode terminal.

Preferably, the metal plate made of the valve metal may include a conductor layer formed on a lower surface thereof and having higher solder-wettability than the valve metal, and the metal plate made of the valve metal and the anode metal plate are bonded by a solder. Such structure allows properly bonding the metal plate made of the valve metal and the anode metal plate. Although the valve metals such as niobium and tantalum have lower solder-wettability than copper or the like, employing the conductor layer having higher solder-wettability assures effective bonding of the metal plate.

A second aspect of the present invention provides a method of manufacturing a solid electrolytic capacitor. The method of manufacturing comprises the steps of: compacting valve metal powder to form a porous compact; positioning the porous compact on a metal plate with a bonding material containing a valve metal powder; and fixing the porous compact to the metal plate by sintering. In accordance with the method, it is possible to manufacture a compact solid electrolytic capacitor having a predetermined characteristics by using only one porous sintered body.

Preferably, the manufacturing method may further comprise the step of preliminarily sintering the porous compact before positioning the porous compact on the metal plate.

A third aspect of the present invention provides a solid electrolytic capacitor comprising: a porous sintered body formed by sintering a compact of a valve metal powder; a metal plate that supports the porous sintered body; and a bonding material provided between the porous sintered body and the metal plate for fixing the porous sintered body to the metal plate. The bonding material may be obtained by heating a paste containing the valve metal powder. Also, the powder contained in the paste is smaller in particle diameter than the powder employed for forming the compact.

Preferably, the compact may be formed of tantalum powder, in a density range of 5.5 to 8.0 g/cm$^3$. More preferably, the density of the compact is in a range of 6.0 to 7.0 g/cm$^3$.

Preferably, the compact may be formed of powder of one of niobium, niobium(II) oxide and niobium nitride, in a density range of 2.3 to 4.5 g/cm$^3$. More preferably, the density of the compact is in a range of 2.5 to 3.5 g/cm$^3$.

Preferably, the compact may be formed of tantalum powder, the metal plate may be made of tantalum, and the powder contained in the paste may be the tantalum powder.

Preferably, the compact may be formed of niobium powder, the metal plate may be made of niobium, and the powder contained in the paste may be the niobium powder.

Preferably, the compact may be formed of niobium(II) oxide powder, the metal plate may be made of niobium, and the powder contained in the paste may be one of the niobium powder, the niobium(II) oxide powder, and the niobium nitride powder.

Preferably, the compact may be formed of niobium nitride powder, the metal plate may be made of niobium, and the powder contained in the paste may be one of niobium powder, niobium(II) oxide powder, and the niobium nitride powder.

Other features and advantages of the present invention will become more apparent through the detailed description given below referring to the accompanying drawings.

BEST MODE FOR CARRYING OUT THE INVENTION

Preferred embodiments of the present invention will be described below with reference to the drawings.

Figure 1:
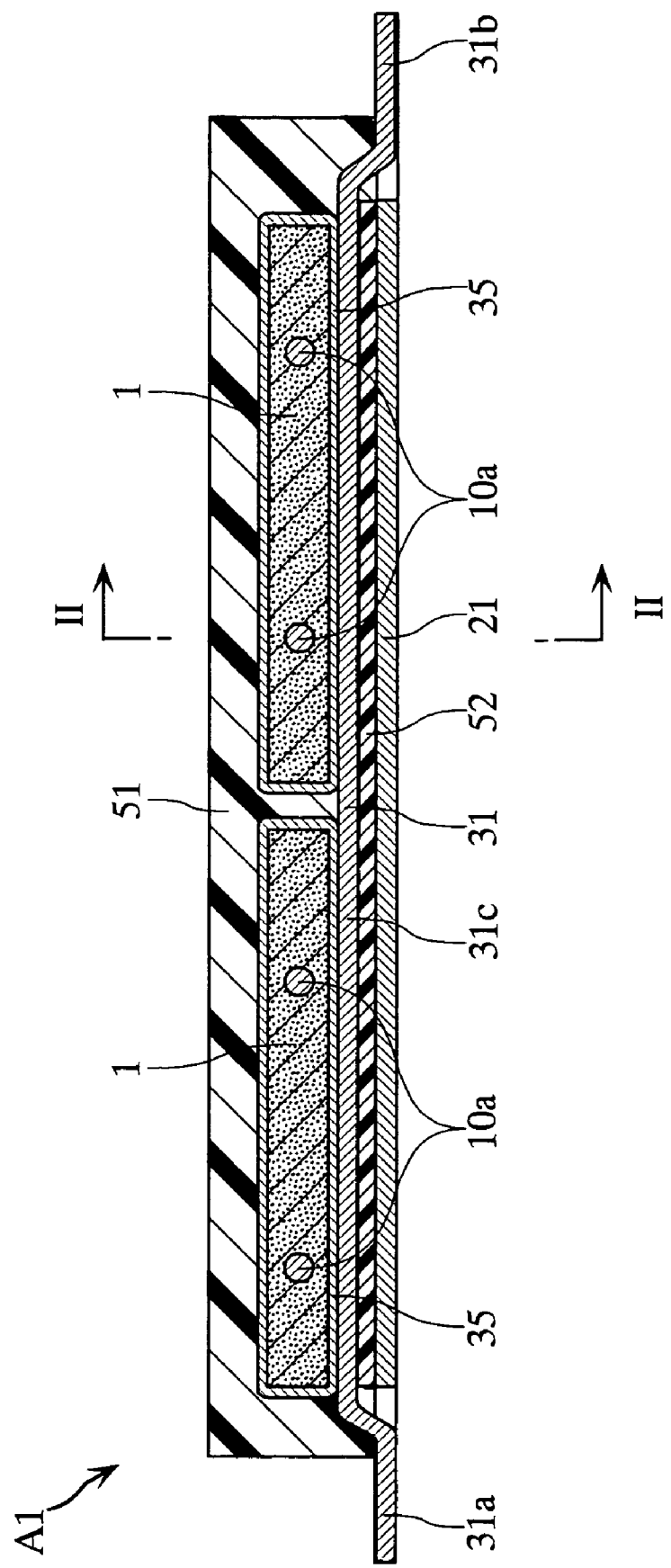
FIG. 1 is a cross-sectional view showing a solid electrolytic capacitor according to a first embodiment of the present invention.
Figure 2:
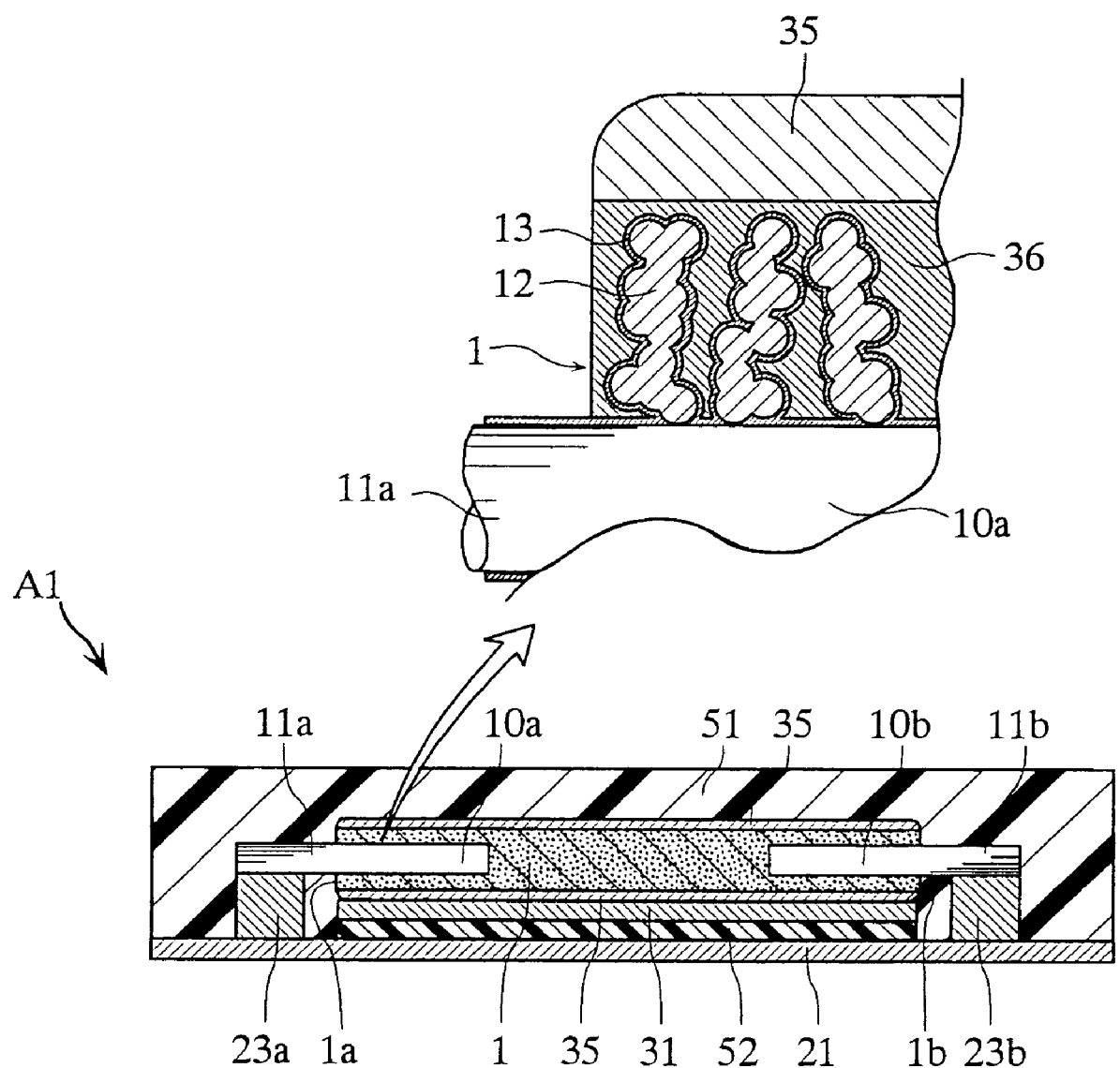
FIG. 2 includes cross-sectional views taken along the line II-II in FIG. 1.
Figure 3:
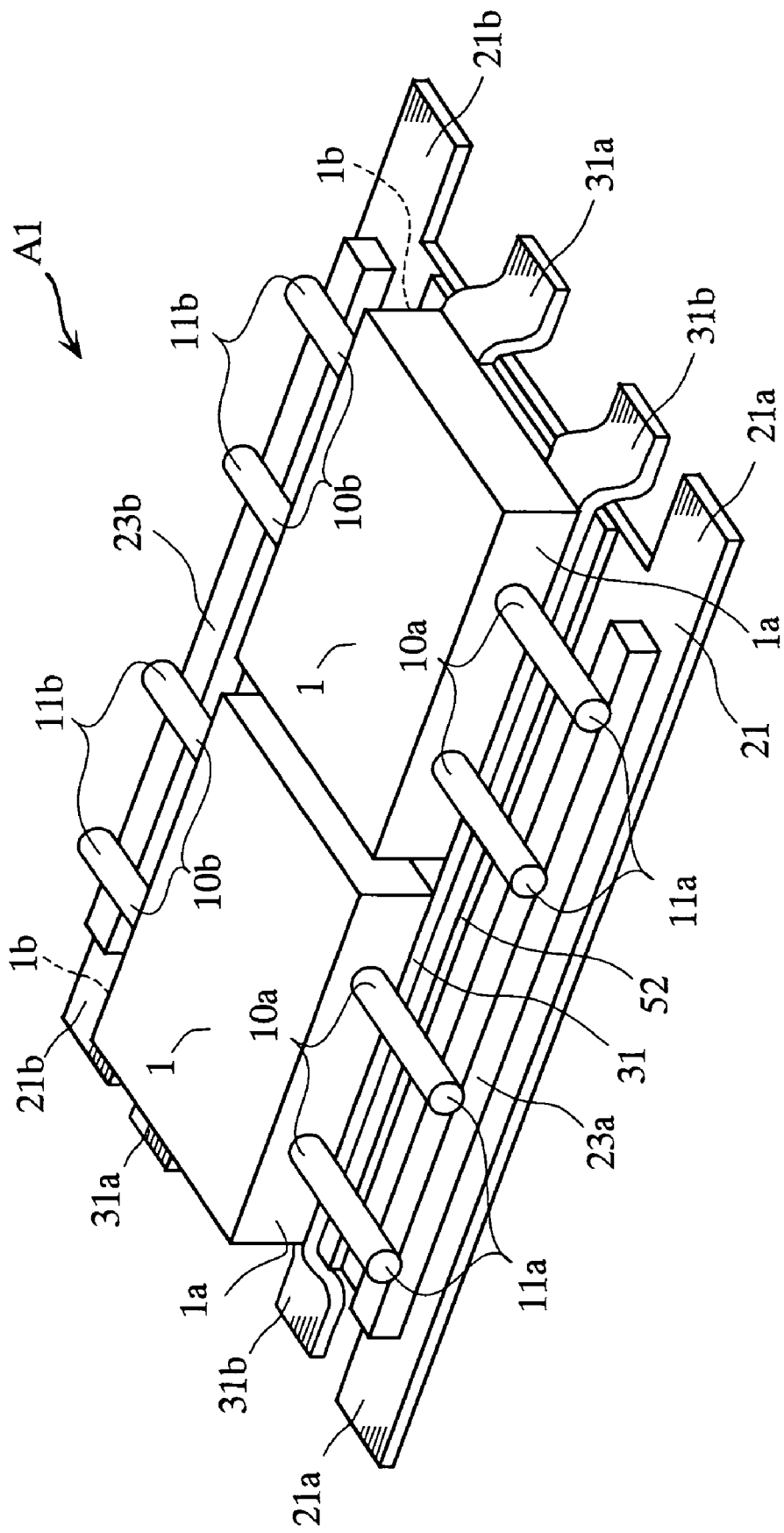
FIG. 3 is a perspective view showing an important portion of the solid electrolytic capacitor according to the first embodiment.
Figure 4:
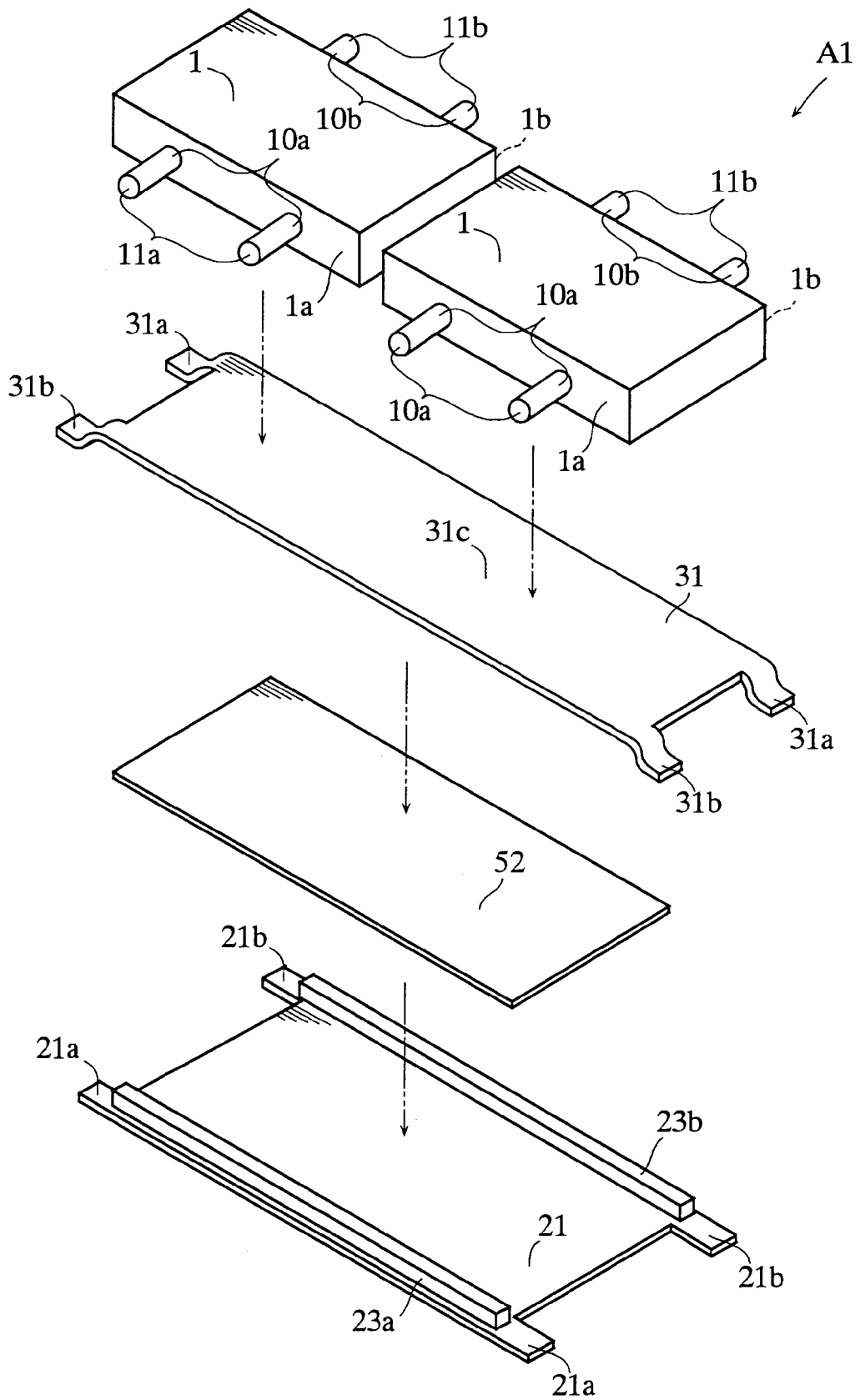
FIG. 4 is an exploded perspective view of the portion shown in FIG. 3.

FIGS. 1 to 4 depict a solid electrolytic capacitor according to a first embodiment of the present invention. The solid electrolytic capacitor A1 includes two porous sintered bodies 1 and eight anode wires 10a, 10b. The capacitor A1 includes input/output external anode terminals 21a, 21b and input/output external cathode terminals 31a, 31b, thus being constituted as a so-called four-terminal type capacitor. The two sintered bodies 1 and the eight wires 10a, 10b are collectively covered with an encapsulating resin 51. In FIGS. 3 and 4, the encapsulating resin 51 is not shown.

Each porous sintered body 1 is obtained by processing niobium, which is a valve metal, into powder, pressure-compacting the powder into a rectangular plate shape, and sintering the compact. The powder of niobium or tantalum may be obtained in a form of fine powder by directly reducing an oxide of niobium or tantalum or a salt thereof with a metal such as Mg, Na, or Ca. To form the powder of a smaller particle diameter, the gas phase is utilized as in a chemical vapor deposition (CVD) process. Each sintered body 1 is flat, and includes two principal surfaces having a relatively large area (upper and lower surface in FIG. 3), and four lateral portions smaller than the principal surfaces. As is understood from FIG. 1 or 3, the two sintered bodies 1 are aligned side by side with a predetermined spacing therebetween, in a direction perpendicular to the direction in which the two principal surfaces of the respective sintered bodies are spaced from each other (for example, in a widthwise or lengthwise direction). As shown in FIG. 2, the porous sintered body 1 includes sintered portions 12 where niobium particles are aggregated by sintering, and minute gaps formed among the sintered portions 12. On the surface of the sintered portions 12, a dielectric layer 13 made of niobium(V) oxide [$Nb_2O_5$], for example. Also, on the surface of the dielectric layer 13, a solid electrolytic layer 36 is provided, so as to serve as a cathode. The solid electrolytic layer 36 is made of for example manganese dioxide or a conductive polymer, and preferably disposed so as to fill the entirety of the gap. The porous sintered body 1 may be made of any valve metal, and for example tantalum, niobium(II) oxide [NbO], or niobium nitride [NbN] may be employed instead of niobium. The niobium(II) oxide and niobium nitride are interstitial compounds, and as highly conductive as a single metal. Fine powder of the niobium(II) oxide may be directly obtained in a powder form by reducing $Nb_2O_5$ with $H_2$, or mixing Nb and $Nb_2O_5$. In addition, the niobium(II) oxide and niobium nitride is barely liable to spontaneous combustion in the fine powder state, unlike the single-metal niobium.

On the outer surface of each porous sintered body 1, a conductive layer 35 is provided for electrical connection to the solid electrolytic layer 36. The conductive layer 35 may be constituted of, for example, a graphite layer and a silver layer stacked thereon.

The eight anode wires 10a, 10b are made of a valve metal such as niobium. In this case, it is preferable that the two porous sintered bodies 1 are formed of niobium(II) oxide. This ensures that the metal wires 10a, 10b and the sintered body 1 are properly bonded to each other. Among the plurality of wires, the one that intrudes into the respective porous sintered body 1 through a lateral face 1a thereof is the input anode wire 10a, and the one that intrudes into the respective porous sintered body 1 through another lateral face 1b thereof is the input anode wire 10b. Out of the input/output anode wires 10a, 10b, the portion projecting from the respective porous sintered body 1 constitutes the input/output internal anode terminals 11a, 11b. Here, the internal anode terminals 11a, 11b correspond to the first and the second internal anode terminal according to the present invention.

The cathode metal plate 31 has its main plate portion 31c bonded to the bottom face of the porous sintered body 1 via the conductive layer 35, so as to be electrically connected to the solid electrolytic layer 36 provided on the inner and outer surface of the porous sintered body 1. The main plate portion 31c stands for an example of the internal cathode terminal according to the present invention. The cathode metal plate 31 includes four extensions extending from the main plate portion 31c, thus constituting two each of the input/output external cathode terminals 31a, 31b.

Under the main plate portion 31c, a resin film 52 is provided for insulation between the anode metal plate 21 and the cathode metal plate 31. For the resin film 52, a polyimide film (such as Kapton® film manufactured by DuPont) may be employed. The polyimide film is, because of its excellent heat resistance and insulation, barely likely to incur deterioration even under a high temperature treatment during the manufacturing process of the solid electrolytic capacitor A1, and assures insulation between the anode metal plate 21 and the cathode metal plate 31. Here, the resin film 52 may be substituted with a ceramic plate for example, for the insulator according to the present invention.

The anode metal plate 21 is stacked on the lower surface of the main plate portion 31c via the resin film 52. The anode conductor plate 21 includes four extensions, which respectively constitute two each of the input/output external anode terminals 21a, 21b. To the vicinity of end portions of the anode metal plate 21, conductors 23a, 23b are respectively bonded, which provides electrical connection to the input-side and output-side internal anode terminals 11a, 11b. Such arrangement provides a bypass electrical path between the input-side and output-side internal anode terminals 11a, 11b, via the anode metal plate 21.

Between the main plate portion 31c of the cathode metal plate 31 and the input/output external cathode terminals 31a, 31b a stepped portion is provided, such that the bottom portions of the four external anode terminals 21a, 21b and of the four external cathode terminals 31a, 31b become flush with one another. Materials of the anode metal plate 21 and the cathode metal plate 31 include a copper alloy and a nickel alloy.

The encapsulating resin 51 covers the porous sintered body 1, anode wire 10a, 10b and so on for protection, and corresponds to the package according to the present invention. The encapsulating resin 51 may be made of a thermosetting resin such as an epoxy resin.

Hereunder, advantageous effects of the solid electrolytic capacitor A1 will be described.

Since the solid electrolytic capacitor A1 includes two porous sintered bodies 1, the total volume of the porous sintered bodies 1 included in the solid electrolytic capacitor A1 can be easily increased. When a single entity of the porous sintered body 1 is excessively large in dimensions unlike this embodiment, the porous compact to constitute the porous sintered body has to be also large, in which case the density may become uneven. When the density of the porous compact is uneven, sufficient contact pressure may not be ensured between the porous compact and the anode wire 10a, 10b inserted into the compact. Sintering such porous compact only results in higher electrical resistance and inductance at connection points between the porous sintered bodes 1 and the anode wires 10a, 10b, thus failing in properly reducing the ESR and ESL of the solid electrolytic capacitor A1. Also, for example when the density in the vicinity of the surface of the porous sintered body 1 becomes unduly high and thereby inhibits proper formation of fine pores on the surface, the porous sintered body 1 cannot be sufficiently impregnated with a predetermined solution for forming the dielectric layer 13 and the solid electrolytic layer 36. Under such situation the dielectric layer 13 and the solid electrolytic layer 36 cannot be properly formed on the porous sintered body 1, which may lead to a drawback such as reduction in static capacitance of the solid electrolytic capacitor A1 or an increase in leak current. According to this embodiment, while each of the porous sintered bodies 1 is formed in such a size that barely incurs uneven density, the total volume of the porous sintered bodies 1 included in the solid electrolytic capacitor A1 can be increased. Accordingly, the capacitance of the solid electrolytic capacitor A1 can be increased while preventing the disadvantages such as disturbance against reduction in ESR and ESL of the solid electrolytic capacitor A1 and an increase in leak current. Naturally it is possible to employ just one sintered body to obtain a capacitor that performs a desired function, and the present invention does not exclude such a case.

The two porous sintered bodies 1 are low in height, which is advantageous for making the solid electrolytic capacitor A1 thinner. When the solid electrolytic capacitor A1 is mounted for example on a substrate of an electronic apparatus, the solid electrolytic capacitor A1 can be kept from excessively protruding upward from the substrate, which facilitates making the electronic apparatus thinner.

In the respective porous sintered body 1, the distance between each anode wire 10a, 10b and the conductive layer 35 can be shortened. Therefore, the electrical path in each porous sintered body 1 can be shortened, which facilitates reducing the resistance and inductance.

Also, the distance between the internal anode terminals 11a, 11b and the external anode terminals 21a, 21b can be shortened, as compared with the case where, unlike this embodiment, for example two porous sintered bodies are vertically stacked. Such structure is advantageous in reducing the resistance and inductance of the electrical path between the internal anode terminals 11a, 11b and the external anode terminals 21a, 21b. Especially, the portion of the electrical path constituted of the conductor 23a, 23b is vertically erected, on both sides of which the running direction of the current is changed. Such portion has, the longer it is, the greater inductance against an alternating current in such a high-frequency region as including harmonics, as compared with a peripheral portion. In this embodiment, since the distance between the internal anode terminals 11a, 11b and the external anode terminals 21a, 21b is shortened, the conductors 23a, 23b are low in height. Accordingly, the erected portion has low inductance, which enables reducing the ESL of the solid electrolytic capacitor A1 as a whole, and thereby improving the noise removal characteristic in the high-frequency region, as well as the response speed in supplying the power.

The input/output anode wires 10a, 10b are spaced from each other across the porous sintered body 1, instead of being concentrated in a portion of the porous sintered body 1. Providing numerous anode wire 10a, 10b on one of the lateral faces of the porous sintered body 1 may lead to insufficient strength of the porous sintered body 1 thus incurring a crack or excessive heat generation at a connection point with the anode wires 10a, 10b. This embodiment prevents such drawbacks, thereby allowing the solid electrolytic capacitor A1 to perform its function to the fullest extent.

The anode metal plate 21 constituting the bypass electrical path is formed in a wide shape from a copper alloy or a nickel alloy which is highly conductive, and therefore the resistance can be reduced as compared with the porous sintered body 1. When such solid electrolytic capacitor A1 is employed for removing a noise in the high-frequency region contained in the circuit current, the DC component of the circuit current can be conducted around the two porous sintered bodies 1 through the bypass electrical path, while conducting the noise, which is an AC component, to each porous sintered body 1. Accordingly, the noise in the high-frequency region can be effectively removed, while suppressing heat generation in the porous sintered body 1. Also, when the solid electrolytic capacitor A1 is employed as the power supply source, each of the anode wires 10a, 10b acts as an electrical path connected in parallel via the anode metal plate 21. Therefore, the electrical energy stored in each porous sintered body 1 can be separately discharged through the anode wires 10a, 10b, which leads to quicker response in supplying power of a large volume.

The cathode metal plate 31 is of a generally flat shape as a whole, and does not occupy a large space in a vertical direction. Since the cathode metal plate 31 is interposed between the porous sintered bodies 1 and for example a substrate on which the solid electrolytic capacitor A1 is mounted, the porous sintered bodies 1 and the substrate can be closely located. Such structure is, therefore, advantageous in reducing the distance between the internal anode terminals 11a, 11b and the external anode terminals 21a, 21b, thus reducing the ESL.

Since the anode metal plate 21, the resin film 52, and the cathode metal plate 31 are stacked on one another, these components and the conductors 23a, 23b may be fabricated into an integral component, for collectively bonding the integral component with the two porous sintered bodies 1 fabricated in a separate process as shown in FIG. 4, when manufacturing the solid electrolytic capacitor A1. Therefore, the manufacturing process can be simplified as compared with the case where, unlike this embodiment, the components that constitute the external anode terminal and the external cathode terminal have to be sequentially bonded to the porous sintered body, for example after fabricating the porous sintered body.

FIGS. 5 to 14 depict other embodiments of the present invention. It is to be noted that in these drawings, constituents that are the same as or similar to those of the foregoing embodiment are given the identical numerals.

Figure 5:
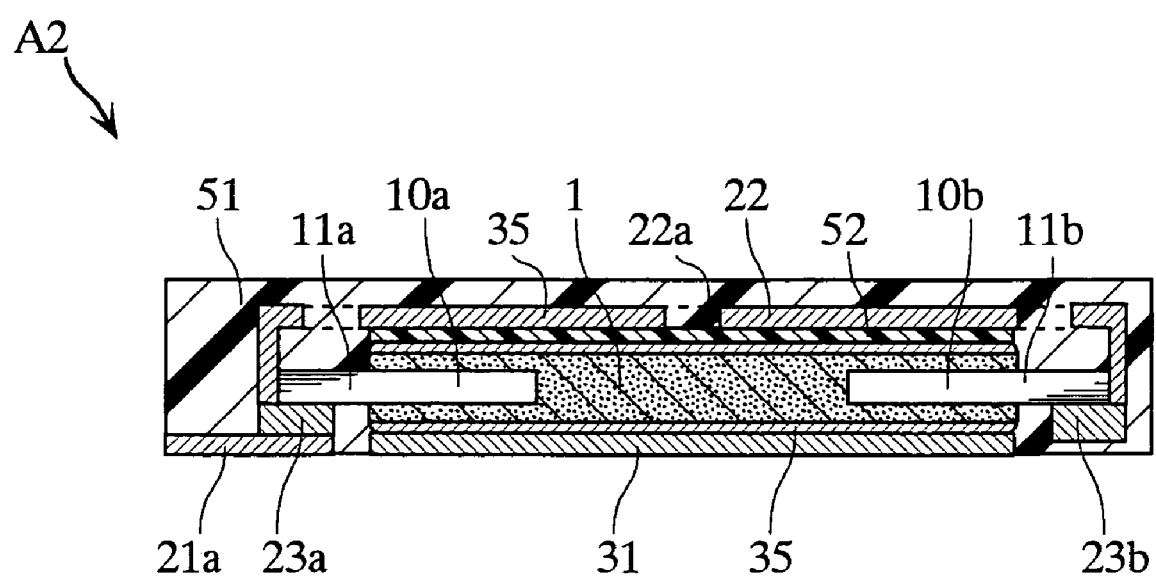
FIG. 5 is a cross-sectional view showing a solid electrolytic capacitor according to a second embodiment of the present invention.
Figure 6:
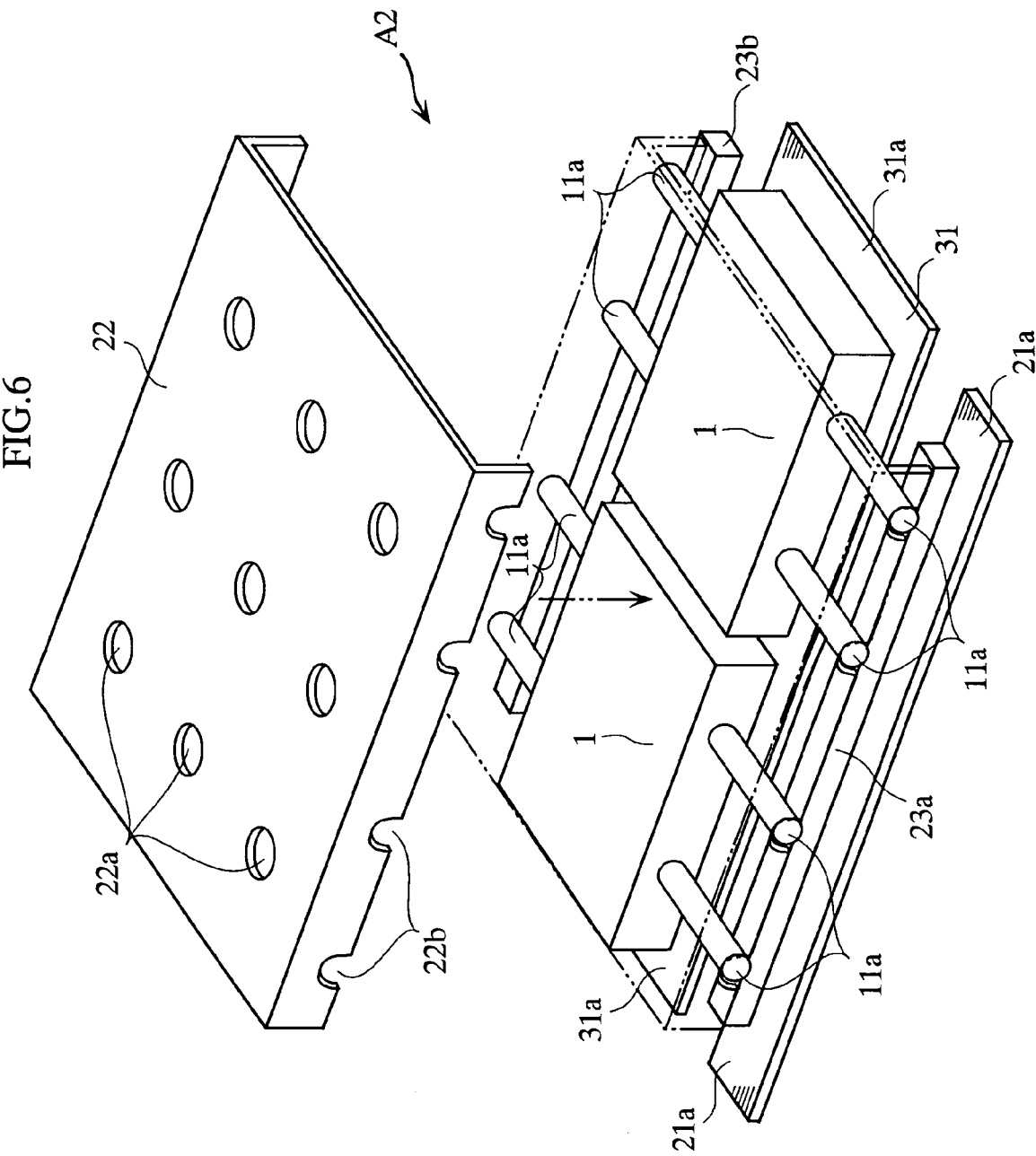
FIG. 6 is an exploded perspective view showing an important portion of the solid electrolytic capacitor according to the second embodiment.

FIGS. 5 and 6 depict a solid electrolytic capacitor according to a second embodiment of the present invention. The solid electrolytic capacitor A2 includes an anode metal cover 22 that electrically connects the input/output internal anode terminals 11a, 11b, which is a difference from the foregoing solid electrolytic capacitor A1. In FIG. 6, the encapsulating resin 51 is not shown.

The anode metal cover 22 is made of for example a copper alloy, and formed in such a shape that can accommodate the two porous sintered bodies 1. On the respective end portions of the anode metal cover 22, four each of recesses 22b are provided so as to be fitted to the input/output internal anode terminals 11a, 11b. The anode metal cover 22 and the input/output internal anode terminals 11a, 11b are bonded for example by welding, via the recesses 22b. Accordingly, the input/output internal anode terminals 11a, 11b are electrically connected via the anode metal cover 22. The anode metal cover 22 is made of a copper alloy which is more conductive than niobium constituting the porous sintered body 1, and is formed in approximately the same width as the total width of the two porous sintered bodies 1. Therefore, the anode metal cover 22 has relatively low resistance. Also, the anode metal cover 22 includes a plurality of holes 22a formed on the upper plate thereof, which facilitates filling a region around the internal anode terminal 11a, 11b with a liquid resin employed to constitute the encapsulating resin 51. The solid electrolytic capacitor A2 includes the external anode terminal 21a and the external cathode terminal 31a, thus constituting a so-called two-terminal type solid electrolytic capacitor.

The resin film 52 serves as an insulator between the anode metal cover 22 and the conductive layer 35, and is bonded to the anode metal cover 22 and the conductive layer 35 with an adhesive (not shown).

The capacitor according to the second embodiment can also reduce the ESR and ESL and increase the capacitance, as in the first embodiment. The anode metal cover 22 has sufficient mechanical strength, and can be prevented from being excessively distorted even when heat is generated in the porous sintered bodies 1. Accordingly, the encapsulating resin 51 can be effectively prevented from incurring a crack, and the porous sintered body 1 can be kept from being exposed to external air. Also, the anode metal cover 22 is more heat-conductive than the encapsulating resin 51. Therefore, heat can be efficiently dissipated from the porous sintered bodies 1 to outside. Such advantages can improve the permissible power loss of the solid electrolytic capacitor A2, and enables supplying power of a larger volume. Here, the anode metal cover 22 may be formed for example in a box shape instead of the illustrated one, as long as the porous sintered body 1 can be accommodated therein.

Figure 7:
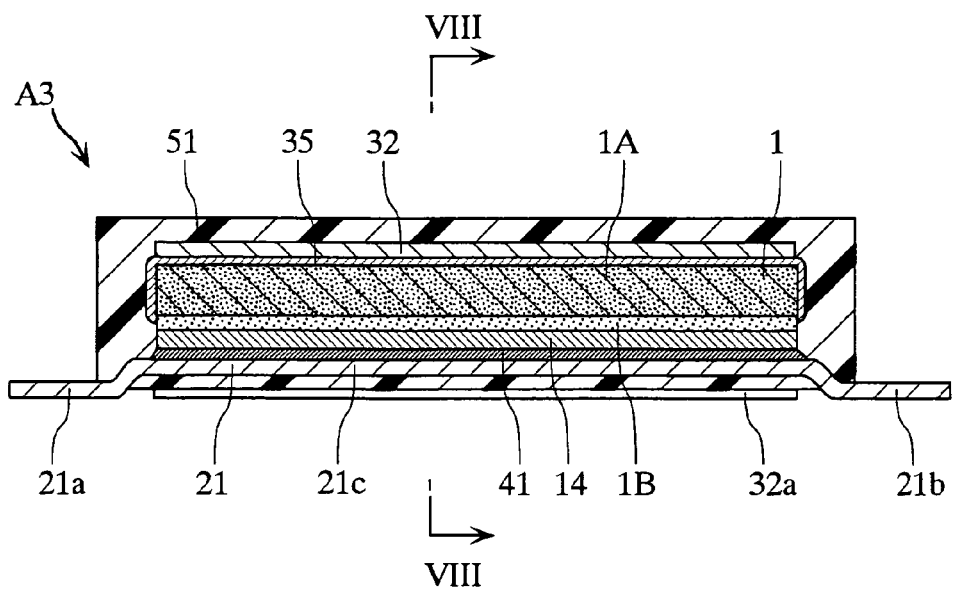
FIG. 7 is a cross-sectional view showing a solid electrolytic capacitor according to a third embodiment of the present invention.
Figure 8:
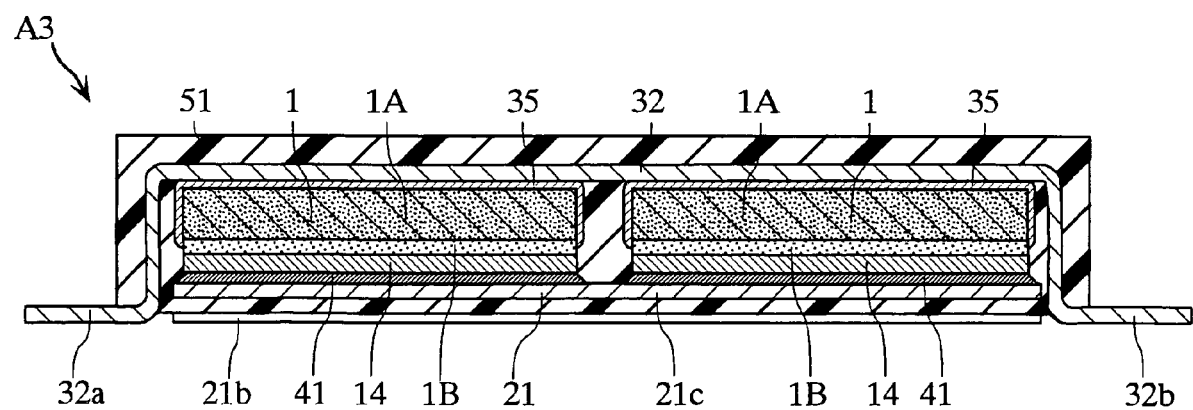
FIG. 8 is a cross-sectional view taken along the line VIII-VIII in FIG. 7.
Figure 9:
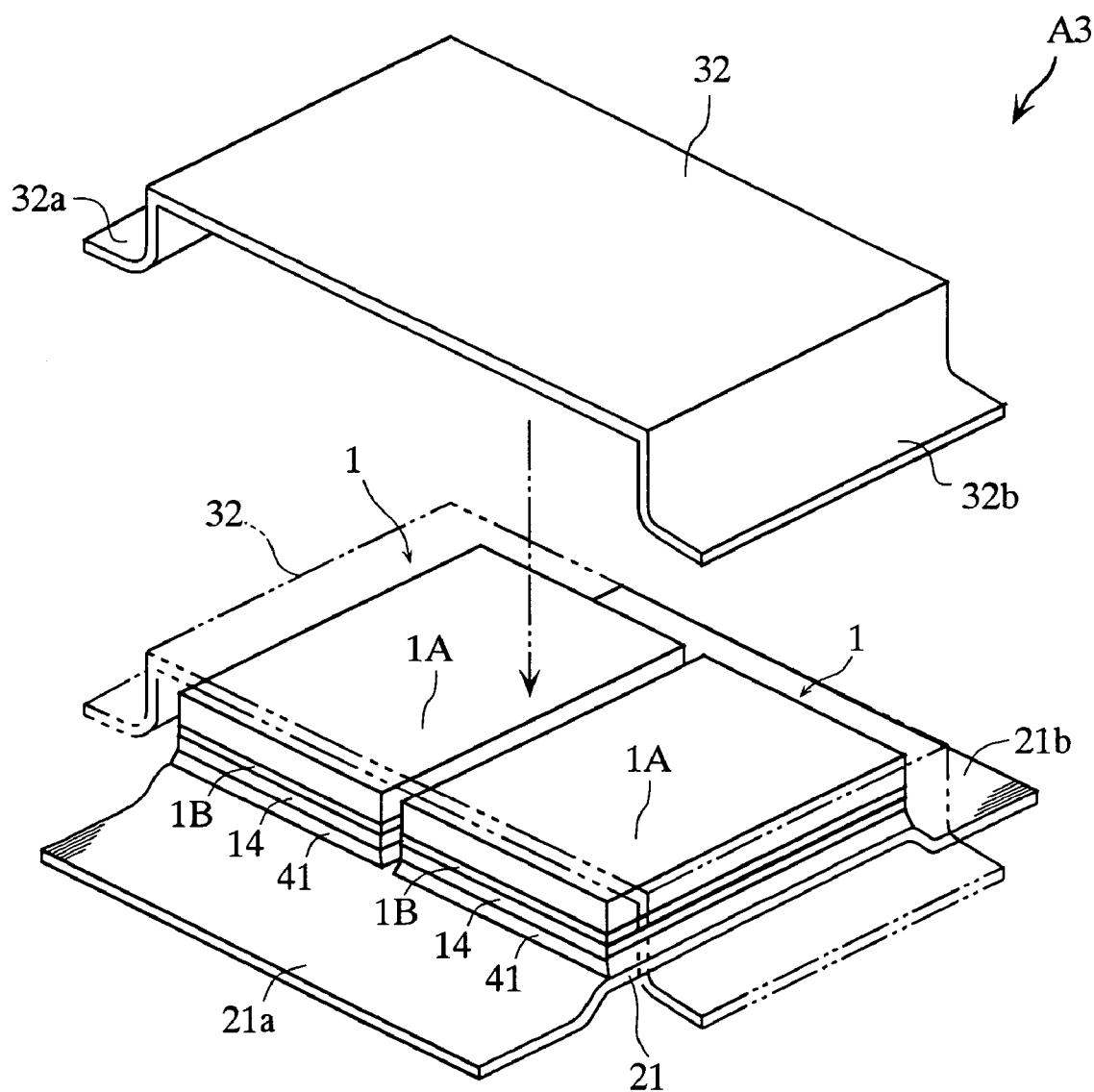
FIG. 9 is an exploded perspective view showing an important portion of the solid electrolytic capacitor according to the third embodiment.

FIGS. 7 to 9 depict a solid electrolytic capacitor according to a third embodiment of the present invention. The solid electrolytic capacitor A3 is different from the foregoing solid electrolytic capacitors A1 and A2 in that the porous sintered body 1 includes an upper layer portion 1A and a lower layer portion 1B, and in that the internal anode terminal is omitted. In FIG. 9, the encapsulating resin 51 is not shown.

The porous sintered body 1 includes a relatively large upper layer portion 1A and a lower layer portion 1B constituting a bottom portion on the lower surface. The upper layer portion 1A and the lower layer portion 1B are both made of a valve metal (for example, niobium). The upper layer portion 1A is given higher density than that of the lower layer portion 1B.

Each porous sintered body 1 is provided on a metal plate 14 that performs a valve action. Each metal plate 14 is for example made of niobium, and is provided with a copper layer (not shown) on a lower surface thereof. The copper layer (and hence the metal plate 14) is soldered to the anode metal plate 21. Preferably, the metal plate 14 may be made of the same material as that of the upper layer portion 1A and the lower layer portion 1B of the sintered body. The metal plate 14 may be made of another valve metal such as tantalum, instead of niobium. Also, the copper layer serves as a conductor layer having higher solder-wettability than niobium. The copper layer may be substituted with a nickel layer.

The anode metal plate 21 is for example made of copper, and is bent so as to form a stepped portion between the respective edge portions 21a, 21b serving as the external anode terminal and a central portion 21c. Although the external anode terminals (edge portions) 21a, 21b are projecting in two directions (opposite to each other) with respect to the central portion 21c, the present invention is not limited to such configuration. For example, the anode metal plate 21 may be formed so as to include the external anode terminals projecting in four different directions with respect to the central portion 21c.

The metal cover 32 is formed so as to include a portion that can accommodate the two porous sintered bodies 1, and is bonded to the upper surface of the two upper layer portions 1A via the conductive layer 35. The respective end portions of the metal cover 32 constitute the input/output external cathode terminals 32a, 32b.

A method of manufacturing the solid electrolytic capacitor A3 will be described, referring to FIGS. 10 to 14.

Figure 10:
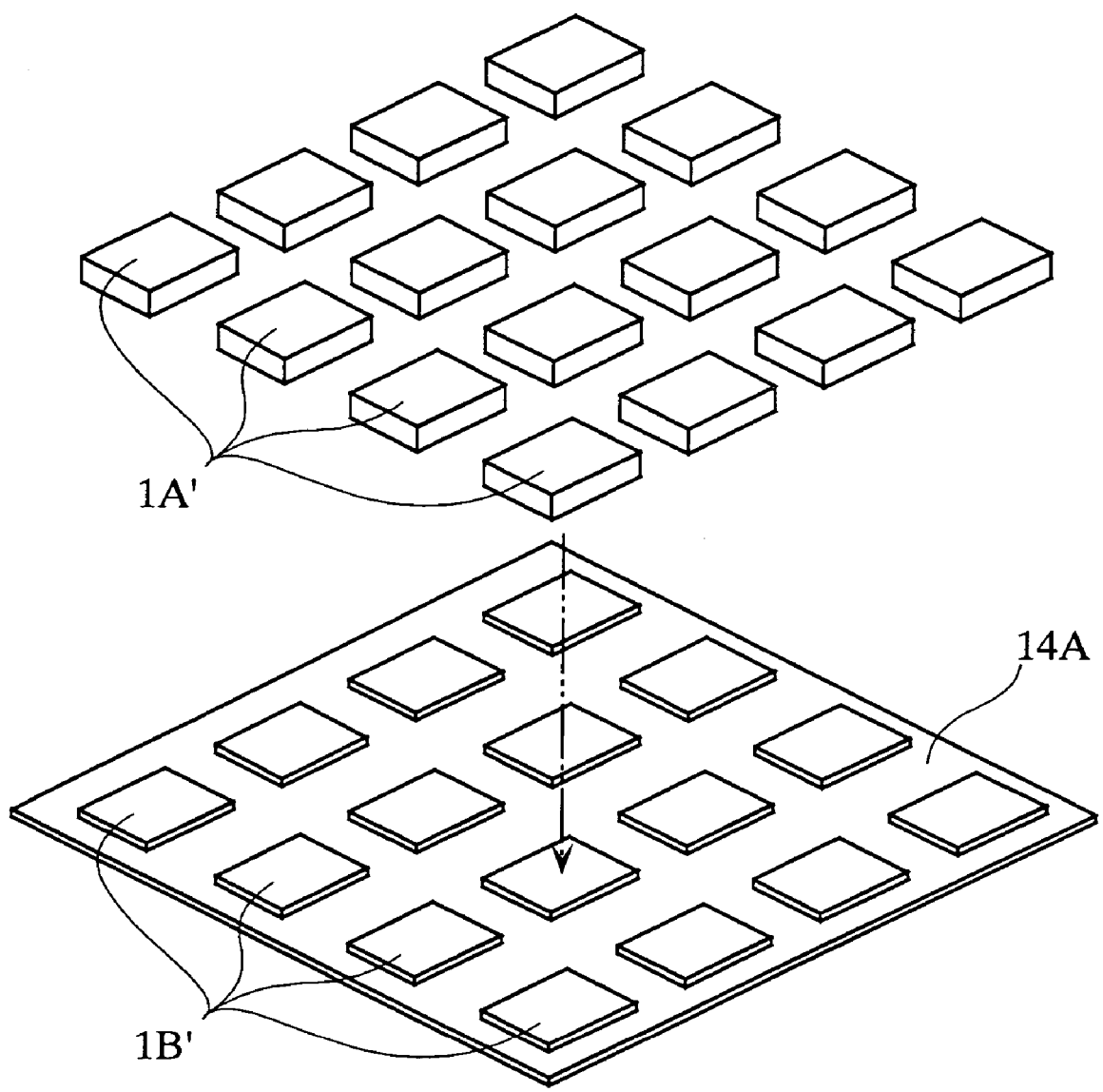
FIG. 10 is a perspective view for explaining a process in a manufacturing method of the solid electrolytic capacitor according to the third embodiment.

Firstly as shown in FIG. 10, a plate material of niobium 14A is prepared, to which a paste 1B' is applied in a matrix pattern. The paste 1B' is a mixture of fine niobium powder and a binding solution. The paste 1B' may be applied by a printing process. After applying the paste 1B', niobium porous compacts 1A' are bonded to the paste 1B'. The porous compacts 1A' may be formed by compacting the niobium powder.

Figure 11:
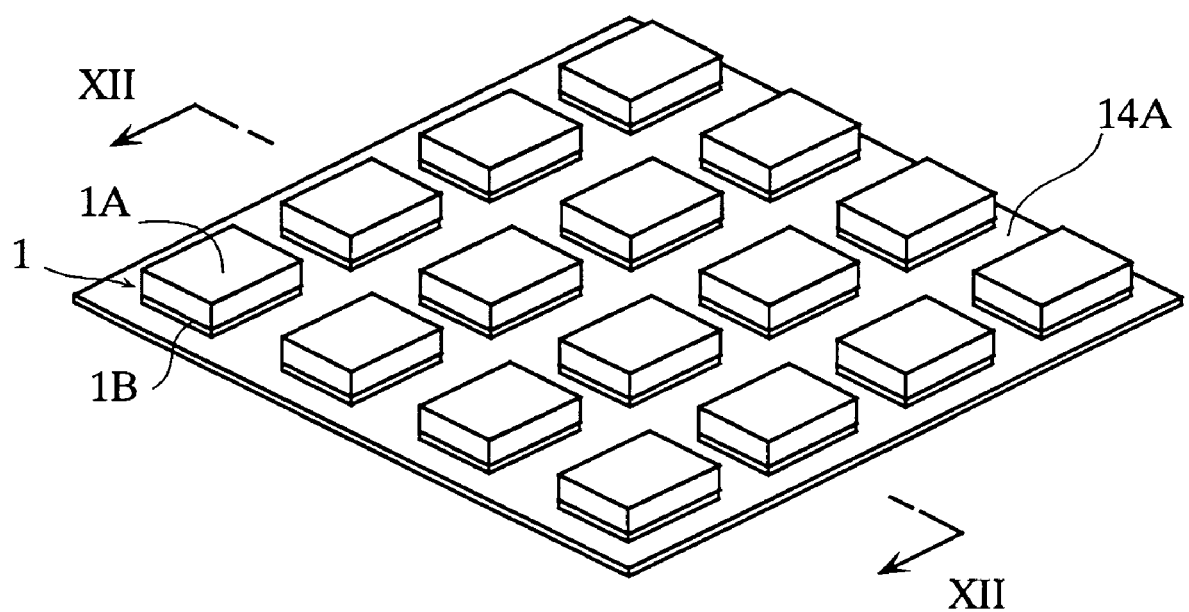
FIG. 11 is a perspective view showing a process subsequent to FIG. 10.

Then the porous compacts 1A' and the paste 1B' are sintered together with the plate material 14A, thus to form the niobium porous sintered bodies 1 including the upper layer portion 1A and the lower layer portion 1B, as shown in FIG. 11. As is explicitly shown in FIG. 12, the porous sintered bodies 1 are dipped in a conversion solution such as a phosphoric acid solution for anodic oxidation, so as to form the dielectric layer 13 on the upper surface of the niobium fine particle compact (sintered portion) constituting the porous sintered body 1 and the plate material 14. Further, the step of dipping the porous sintered bodies 1 in a processing solution such as a manganese nitrate solution and raising for heating is repeated, so as to form the solid electrolytic layer 36. On the solid electrolytic layer 36, the conductive layer 35 constituted of for example a graphite layer and a silver layer is formed. Also, on the lower surface 14a of the plate material 14A, a copper layer 41 is formed, for example by plating.

Figure 13:
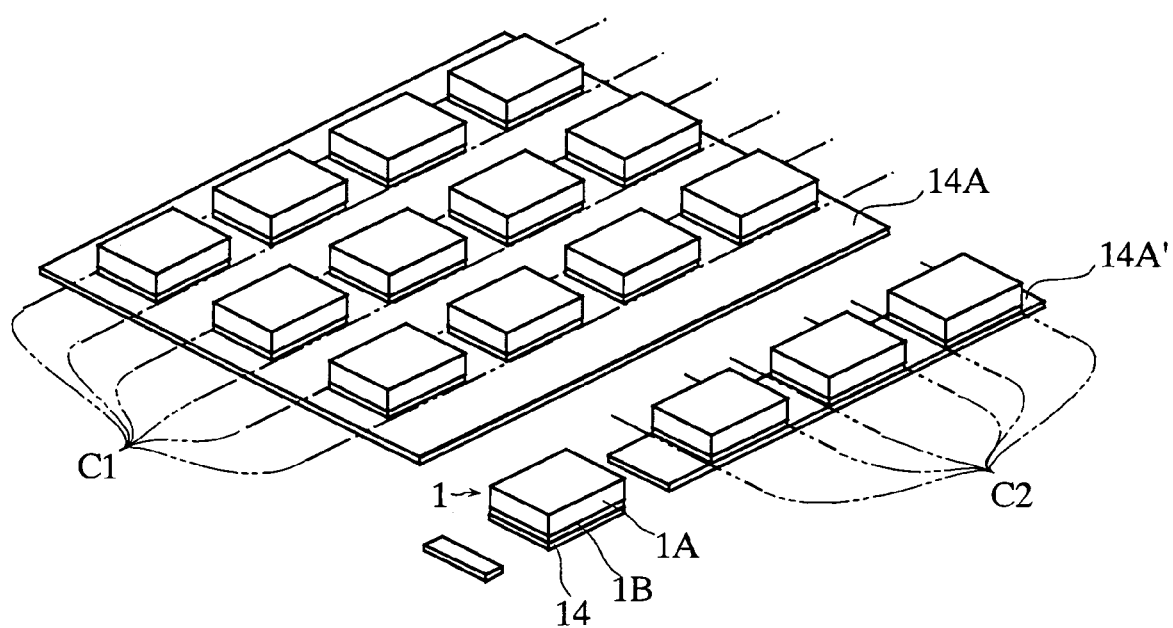
FIG. 13 is a perspective view showing a process subsequent to FIG. 11.

After forming the dielectric layer 13, the solid electrolytic layer 36 and so on the porous sintered bodies 1, the plate material 14A is cut as shown in FIG. 13, to be split into each porous sintered body 1. Firstly, the plate material 14A is cut along cutting lines C1, thus to be split into a plurality of plate strips 14A' including a plurality of. porous sintered bodies 1. Such plate strips 14A' are cut along cutting lines C2, thus to be split into a plurality of porous sintered bodies 1, each of which is located on the niobium plate 14.

Figure 14:
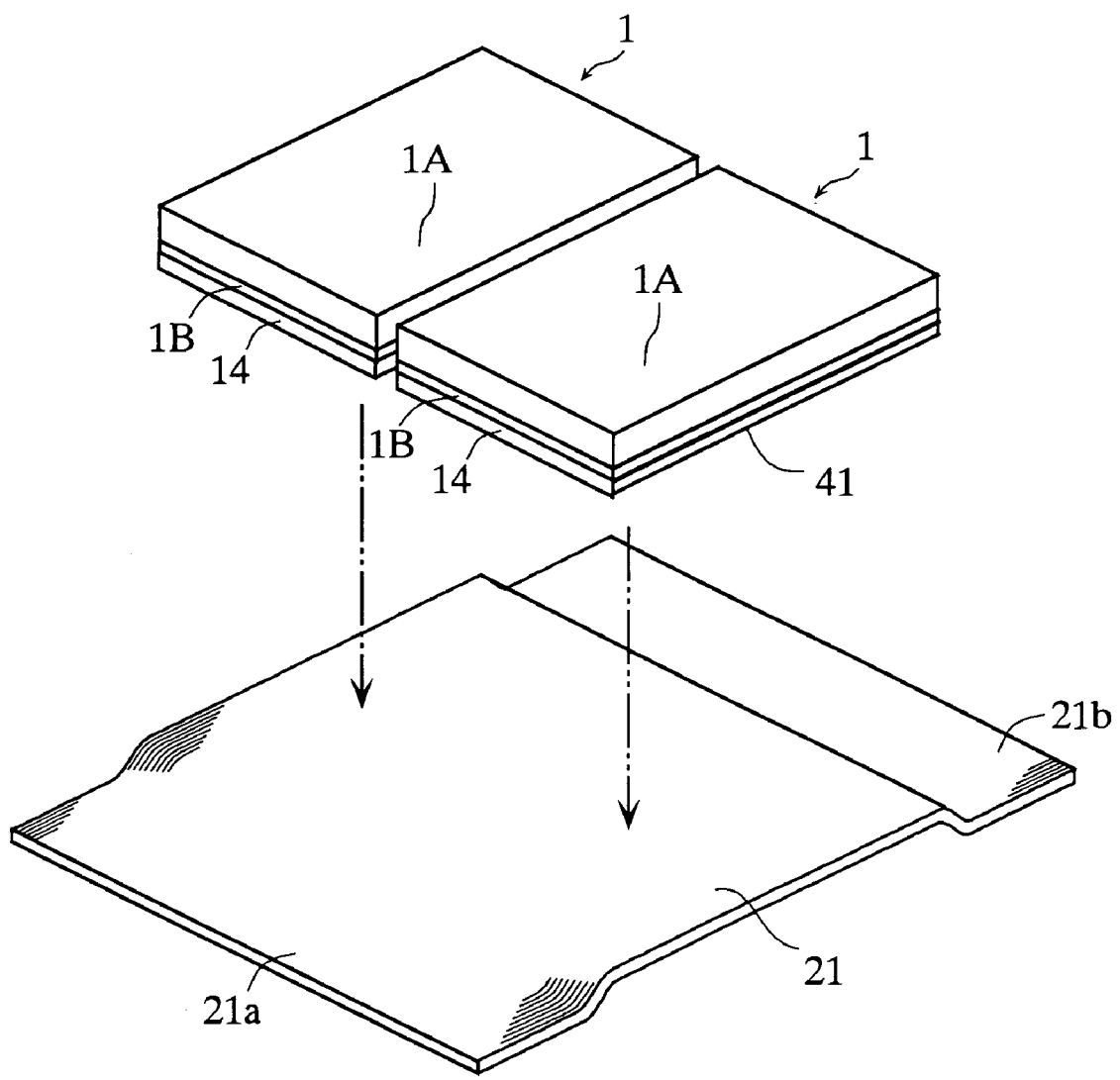
FIG. 14 is a perspective view showing a process subsequent to FIG. 13.

After splitting into the plurality of porous sintered bodies 1, two of the porous sintered bodies 1 are bonded to the anode metal plate 21, as explicitly shown in FIG. 14. This bonding process is performed by soldering, utilizing the copper layer 41 formed on the lower surface of each niobium plate 14. The anode metal plate 21 is bent in advance, so as to create a stepped portion between the respective edge portions and the central portion thereof. Such edge portions are to constitute the external anode terminals 21a, 21b.

After that, the metal cover 32 is bonded and the encapsulating resin 51 is provided to cover the porous sintered bodies 1, to thereby obtain the solid electrolytic capacitor A3 shown in FIGS. 7 and 8. Such manufacturing method enables collectively fabricating a plurality of solid electrolytic capacitors A3 at a time, thus improving the production efficiency.

The advantageous effects of the solid electrolytic capacitor A3 will be described below.

In the foregoing structure, since the upper layer portion 1A is not directly bonded to the niobium plate 14, the upper layer portion 1A does not have to be given a nature suitable for bonding with the niobium plate 14, but can be formed in high density. Forming the upper layer portion 1A in high density allows increasing the static capacitance per unit volume, thereby enabling reducing the size of the solid electrolytic capacitor A3 yet increasing the capacitance thereof. On the other hand, since the capacitance of the solid electrolytic capacitor A3 can be increased because of the upper layer portion 1A, the lower layer portion 1B does not have to be formed in high density. For example, the lower layer portion 1B may be formed from powder of an average particle diameter appropriate for bonding the upper layer portion 1A and the niobium plate 14, and a bonding material containing a binding solution. Also, the joint area between the lower layer portion 1B and the niobium plate 14 can be made relatively large. Accordingly, the upper layer portion 1A, the lower layer portion 1B, and the anode metal plate 21 can be securely bonded, and reduction in resistance and inductance of these components leads to reduction in ESR and ESL of the solid electrolytic capacitor A3. Further, the valve metal such as niobium or tantalum has lower solder-wettability as compared with for example copper, which makes it generally difficult to bond the valve metal by soldering or the like to a plate material made of copper. In this embodiment, since the copper layer 41 is provided on the lower surface of the niobium plate 14, the niobium plate 14 can be securely bonded to the anode metal plate 21 by soldering. In such aspect too, therefore, the foregoing structure is advantageous in reducing the resistance and inductance of the solid electrolytic capacitor A3.

Figure 12:
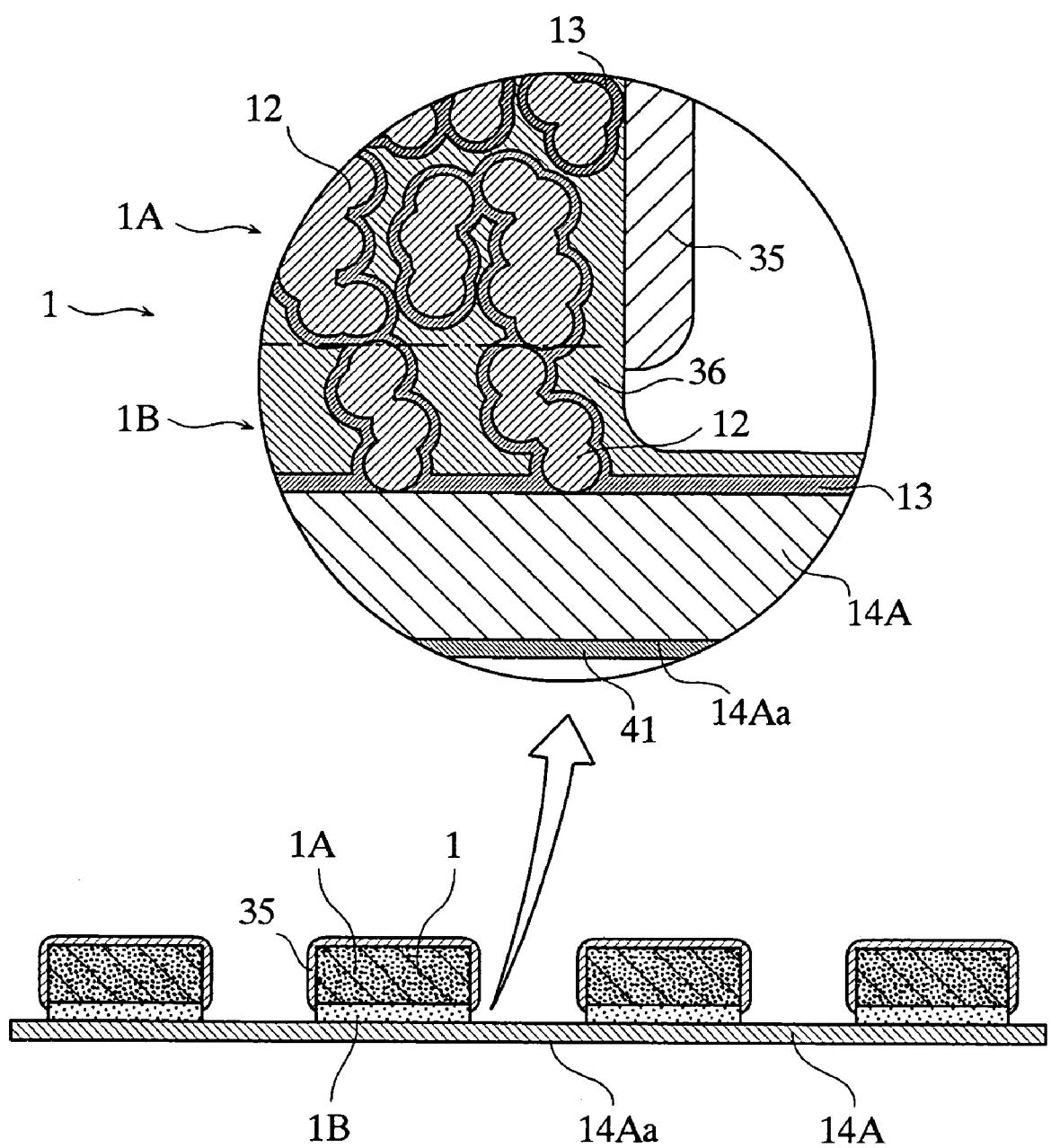
FIG. 12 includes cross-sectional views taken along the line XII-XII in FIG. 11.

In the manufacturing method of the foregoing solid electrolytic capacitor A3, the niobium porous compact 1A' is placed on the plate material 14A via the paste 1B' (FIG. 10). Then the porous compact 1A', the paste 1B' and the plate material 14A are collectively sintered (FIG. 12). Instead of such method, the porous compact 1A' may be preliminarily sintered in advance of being placed on the plate material 14A. Then the preliminarily sintered porous compact 1A' is placed on the plate material 14A via the paste 1B', for collectively sintering these components (main sintering). Tentatively sintering thus the porous compact 1A' allows reducing. the shrinkage of the porous compact 1A' during the main sintering process. As a result, the porous compact 1A' and the plate material 14A are securely bonded. For the paste 1B', a binder used for ordinary powder compacting, such as acrylic or cellulose may be employed in mixture with the valve metal powder. Preferably, the particle diameter of the valve metal powder contained in the paste 1B' is smaller than the particle diameter of the valve metal powder to constitute the porous compact 1A' Such structure allows the valve metal powder contained in the paste 1B' to be securely bonded (sintered) to the porous compact 1A' and the plate material 14A, even under a relatively low temperature. Also, when the particle diameter of the valve metal powder contained in the paste 1B' is smaller than the particle diameter of the valve metal powder to constitute the porous compact 1A', the valve metal powder becomes prone to incur spontaneous combustion because of the fine particle size. Accordingly, it is preferable to store such fine powder in an appropriate liquid. In the above example, since the fine powder of the valve metal is contained in the (solution of) paste 1B', the spontaneous combustion can be effectively prevented. Also, mixing the powder in a predetermined solution to turn the powder into a paste allows increasing the density to be obtained after sintering, even when the powder is fine and has high bulk density.

Figure 15:
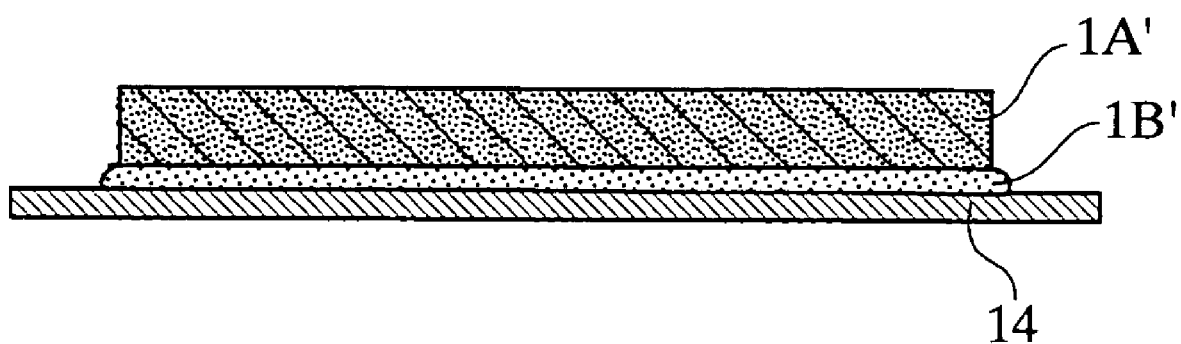
FIG. 15 is a cross-sectional view showing a variation of the important portion of the solid electrolytic capacitor according to the present invention.

As already stated, preliminarily sintering the porous compact allows reducing the shrinkage of the porous compact during the main sintering process. Accordingly, even though the porous compact is formed in a small size, the porous compact can be securely fixed (sintered) to the metal plate material. In such a case, fixing a single porous compact to the metal plate material with a bonding paste enables fabricating a device that has a desired characteristic. Specifically as shown in FIG. 15, a porous compact 1A' is fixed to the metal plate 14 via the bonding paste 1B'. The porous compact 1A' may be obtained for example by compacting the niobium powder and then sintering (preliminarily sintering) the compact. The density of the niobium compact may be in a range of 2.3 to 4.5 g/cm$^3$, and more preferably in a range of 2.5 to 3.5 g/cm$^3$.

In the above example, the porous compact 1A' and the metal plate 14 are both made of niobium (Nb), and the paste 1B' contains niobium powder as the valve metal powder (referred to as "paste metal powder" below). However, the present invention is not limited to these examples, and various combinations, as described below, may be adopted.

EXAMPLE 1

The porous compact 1A' is made of tantalum powder, and the metal plate 14 is made of tantalum. In this case, tantalum powder is used for the paste metal powder. The density of the porous compact 1A' may range from 5.5 to 8.0 g/cm$^3$, and more preferably in a range of 6.0 to 7.0 g/cm$^3$.

EXAMPLE 2

The porous compact 1A' is made of niobium(II) oxide powder, and the metal plate 14 is made of niobium. For the paste metal powder, one of niobium(II) oxide powder, niobium powder and niobium nitride powder is used. The density of the porous compact 1A' may range from 2.3 to 4.5 g/cm$^3$, and more preferably in a range of 2.5 to 3.5 g/cm$^3$. Niobium (II) oxide powder for forming the porous compact 1A' permits the sintering to be performed at a high temperature, which results in firm adhesion of the porous compact 1A' and the metal plate 14. Also, it is possible to form a thicker sintered body (1 mm or more) or a thinner sintered body (approximately 100 μm) more properly than by using pure niobium. Niobium(II) oxide is superior in incombustibility to niobium, and hence produces highly reliable devices.

EXAMPLE 3

The porous compact 1A' is made of niobium nitride powder, and the metal plate 14 is made of niobium. For the paste metal powder, use is made of the one selected from the group of niobium powder, niobium(II) oxide powder and niobium nitride powder. The density of the porous compact 1A' may range from 2.3 to 4.5 g/cm$^3$, and more preferably in a range of 2.5 to 3.5 g/cm$^3$. Making the porous compact 1A' with niobium nitride powder ensures that the manufactured device is superior in heat resistance to the one using a porous compact of niobium(II) oxide.

Figure 16:
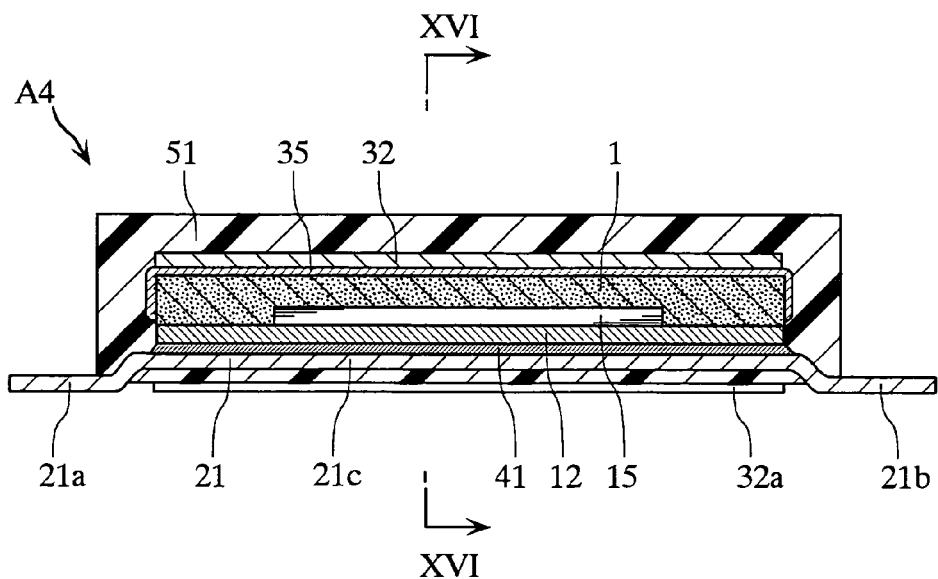
FIG. 16 is a cross-sectional view showing a solid electrolytic capacitor according to a fourth embodiment of the present invention.
Figure 17:
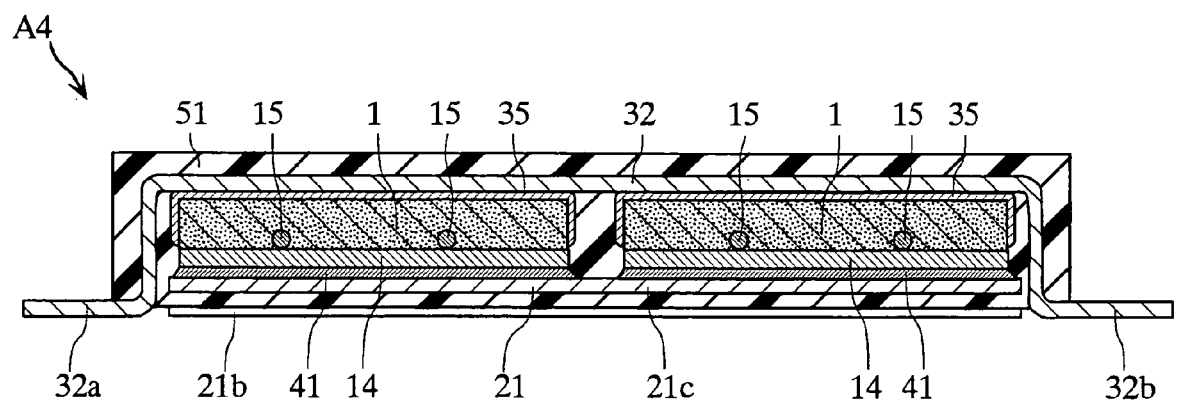
FIG. 17 is a cross-sectional view taken along the line XVI-XVI in FIG. 16.
Figure 18:
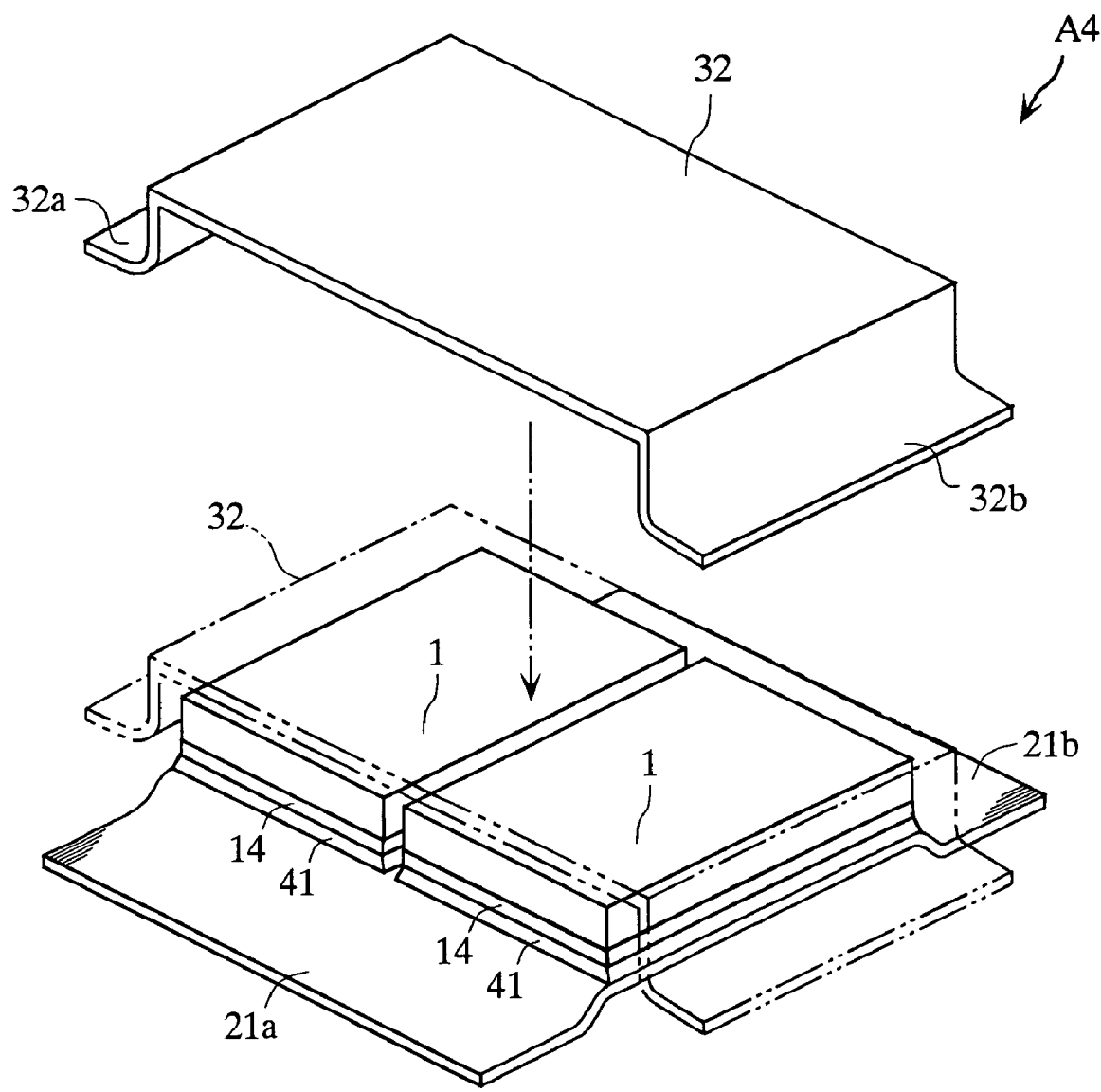
FIG. 18 is an exploded perspective view showing an important portion of the solid electrolytic capacitor according to the fourth embodiment.

FIGS. 16 to 18 depict a solid electrolytic capacitor according to a fourth embodiment of the present invention. The solid electrolytic capacitor A4 includes two porous sintered bodies 1, input/output external anode terminals 21a, 21b and input/output external cathode terminal 32a, 32b, thereby constituting a so-called four-terminal type solid electrolytic capacitor. In FIG. 18, the encapsulating resin 51 is not shown.

The porous sintered bodies 1, arranged side by side in their width direction, are obtained by compacting niobium powder into the shape of rectangular plates and sintering the compacts. The inner and outer surfaces of each sintered body 1 is covered with a dielectric layer (not shown) made of niobium (V) oxide for example, and a solid electrolytic layer (not shown) serving as a cathode. The porous sintered bodies 1 may be made of any valve metal, and tantalum may be employed instead of niobium. Further, the present invention is also applicable to a solid electrolytic capacitor including just one porous sintered body 1.

The porous sintered bodies 1 are formed on the niobium plate 14. A plurality of wires 15 made of niobium are welded to the upper surface of the niobium plate 14, and the porous sintered bodies 1 are disposed so as to cover the wires 15. The lower surface of the niobium plate 14 is formed with a copper layer (not shown) via which the sintered bodies are soldered to the anode metal plate 21. The metal wires 15 are provided to give unevenness to the upper surface of the niobium plate 14, and may be replaced by e.g. square column-shaped metal members. The niobium plate 14 is an example of the valve metal plate according to the present invention, and preferably made of the same material as the one used for making the porous sintered body 1. A tantalum plate, for example, may be used instead of the niobium plate 14. The copper layer mentioned above serves as a conductor layer exhibiting higher solder-wettability than the niobium plate 14. Such a conductor layer may be made of e.g. nickel instead of copper.

The anode metal plate 21 is made of e.g. copper, and is bent so as to form a stepped portion between the central portion 21c and each of the edge portions 21a, 21b serving as external anode terminals.

The metal cover 32 is formed to include a portion for accommodating the two porous sintered bodies 1, and is bonded to the upper surface of the two porous sintered bodies 1 via the conductive layer 35. The respective end portions of the metal cover 32 constitute the input/output external cathode terminals 32a, 32b.

Referring to FIGS. 19 to 23A, a method of manufacturing the solid electrolytic capacitor A4 will be described below.

Figure 19:
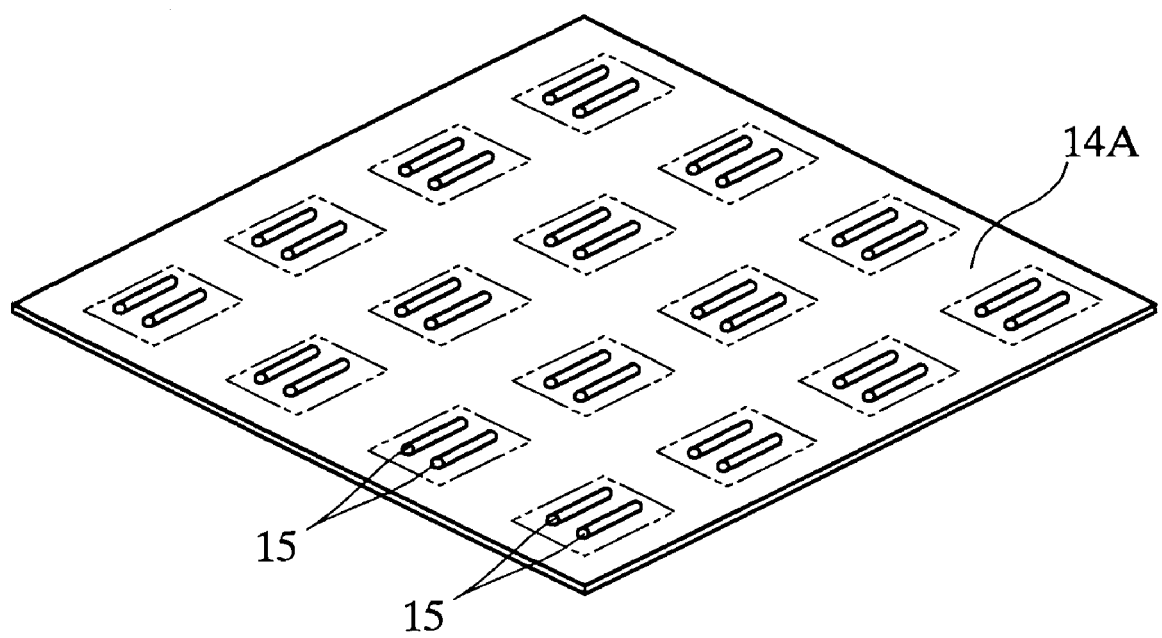
FIG. 19 is a perspective view showing a process in a manufacturing method of the solid electrolytic capacitor according to the fourth embodiment.

First, as shown in FIG. 19, a plate material of niobium 14A is prepared, to which a plurality of wires 15 are welded. The wires 15 are arranged in a matrix pattern in regions where porous sintered bodies 1 to be described later are to be formed.

Figure 20:
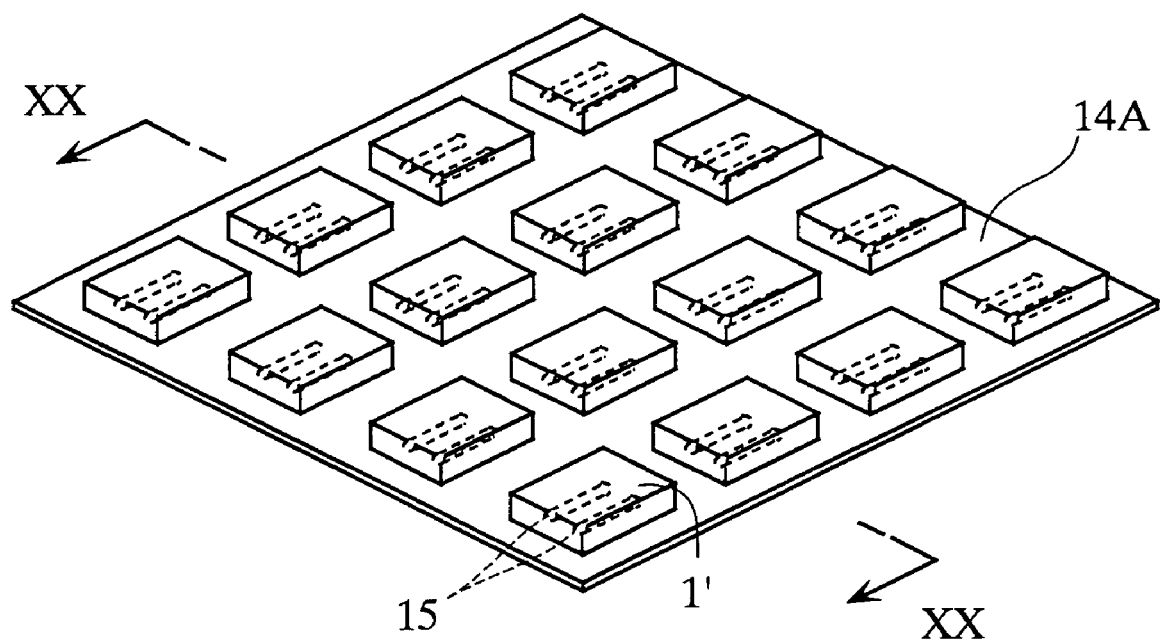
FIG. 20 is a perspective view showing a process subsequent to FIG. 19.
Figure 21:
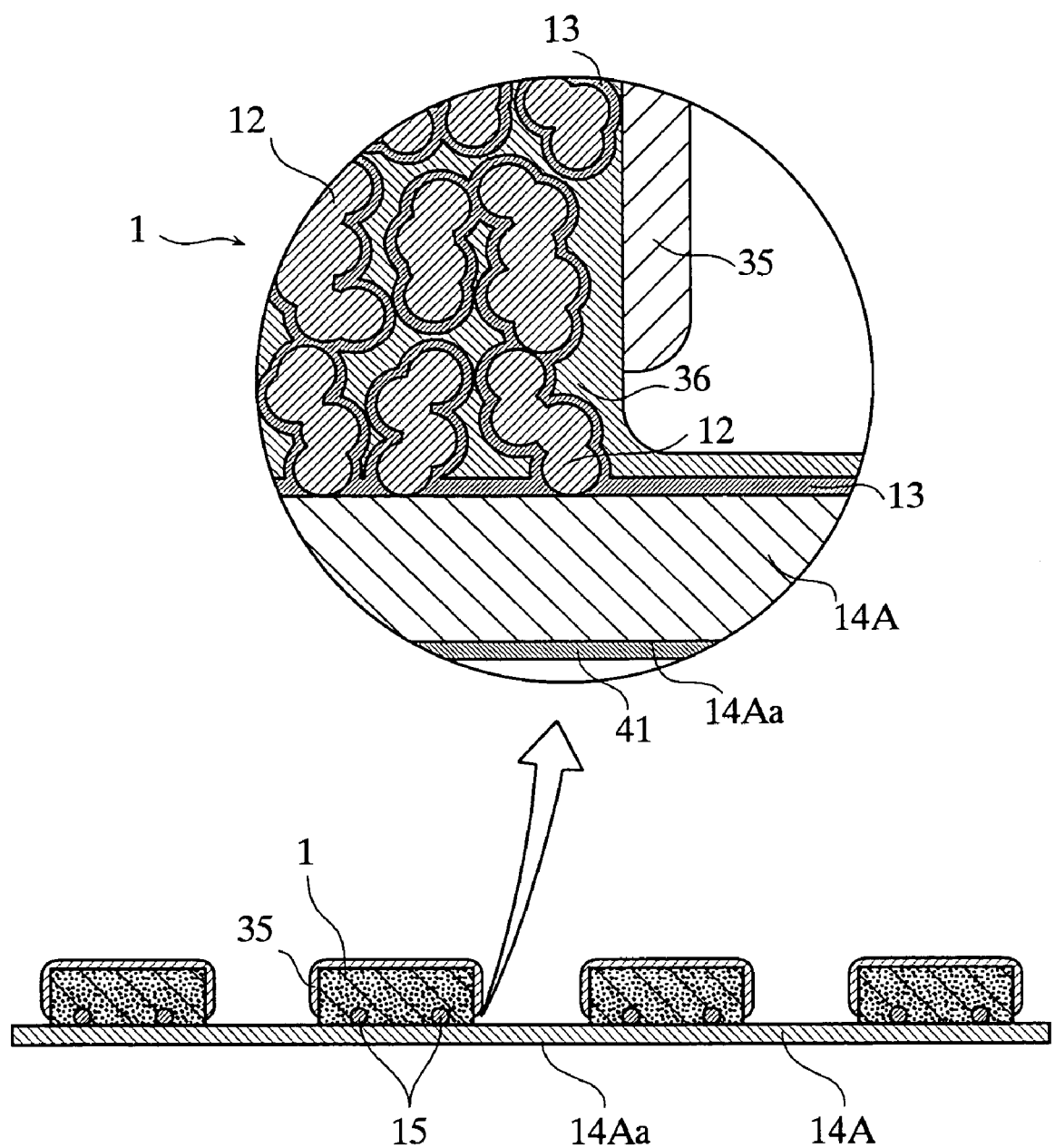
FIG. 21 is a cross-sectional view taken along the line XX-XX in FIG. 20.

Then as shown in FIG. 20, a plurality of niobium porous compacts 1' are formed on the plate material 14A. The porous compact 1' may be formed through the following steps. First, the plate material 14A is placed on an upper surface of a first die constituting a lower portion of a die. Then a second die on which a plurality of rectangular spaces are arranged in a matrix pattern is laid down from above on the plate material 14A (the respective spaces are located so as to accommodate a corresponding wire 15). After that, the plurality of spaces is filled with niobium powder, and a punch with a plurality of projections that fit the spaces is lowered to compact the powder, to form the porous compacts 1'. After forming the porous compacts 1', the porous compacts 1' are sintered together with the plate material 14A, thus to form the porous sintered bodies 1. Then the porous sintered bodies 1 are dipped in a known solution such as a phosphoric acid solution for anodic oxidation. As shown in FIG. 21, the dielectric layer 13 is formed on the upper surface of the fine particles of niobium (sintered portion) 12 constituting the porous sintered bodies 1 and the plate material 14. Further, the porous sintered bodies 1 are dipped in a solution such as a manganese nitrate solution, and then raised out for heating (this step is repeated if necessary). As a result, the solid electrolytic layer 36 is obtained. On the solid electrolytic layer 36, a conductive layer 35 consisting of a graphite layer and a silver layer is formed. The lower surface 14a of the plate material 14A is formed with a copper layer 41 by plating, for example.

Figure 22:
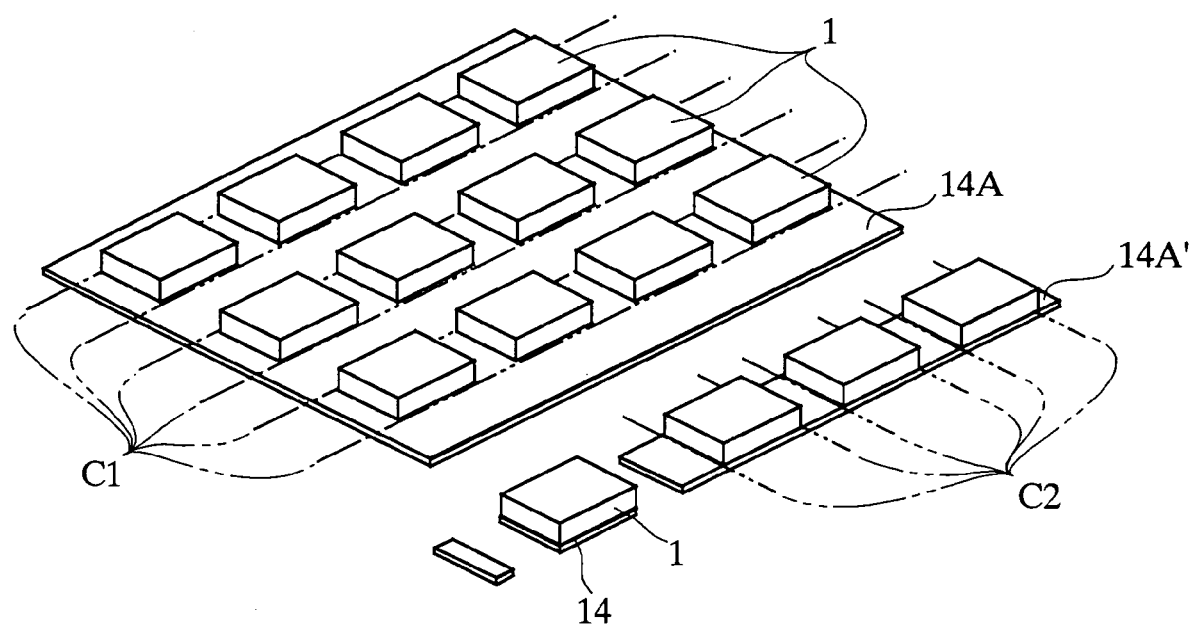
FIG. 22 is a perspective view showing a process subsequent to FIG. 20.

After the dielectric layer 13, the solid electrolytic layer 36 and so on are formed on each sintered body 1, the plate material 14A is cut as shown in FIG. 22, to be divided into each porous sintered body 1. First, the plate material 14A is cut along cutting lines C1, to be divided into a plurality of plate strips 14A' with a plurality of porous sintered bodies 1 thereon. Such plate strips 14A' are cut along cutting lines C2, thus to be divided into a plurality of porous sintered bodies 1, each of which is located on the niobium plate 14.

Figure 23:
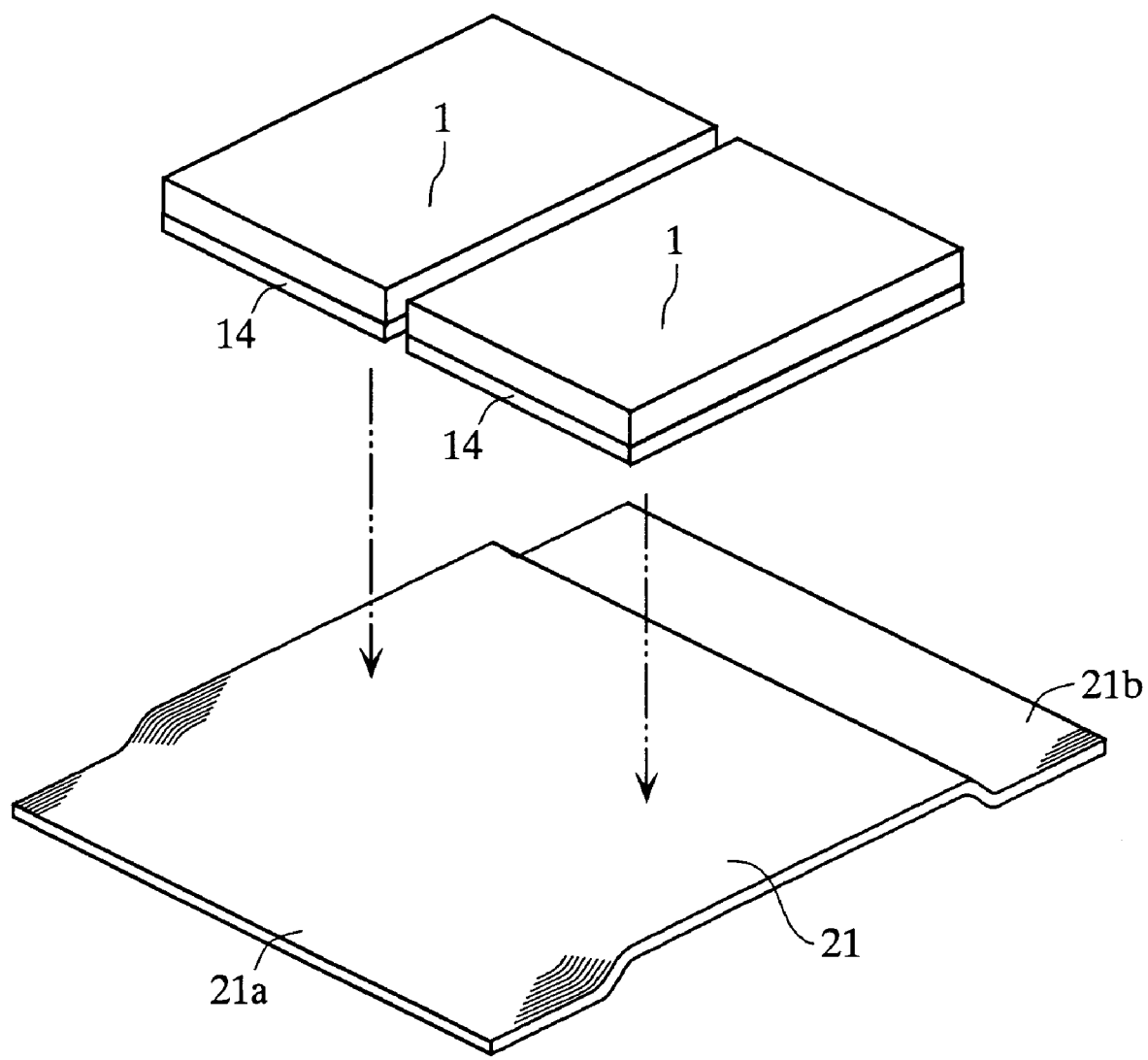
FIG. 23 is a perspective view showing a process subsequent to FIG. 22.

After a plurality of porous sintered bodies 1 are obtained, two of the sintered bodies 1 are bonded to the anode metal plate 21, as shown in FIG. 23. This bonding process is performed by soldering, with respect to the copper layer 41 formed on the lower surface of each niobium plate 14. The anode metal plate 21 is bent in advance, so as to create a stepped portion between the respective edge portions and the central portion thereof. Such edge portions provide the external anode terminals 21a, 21b.

Thereafter, the metal cover 32 is fixed, and the porous sintered bodies 1 are covered with the encapsulating resin 51. Thus, the solid electrolytic capacitor A4 shown in FIGS. 16 and 17 are obtained. Such manufacturing method enables collective fabrication of a plurality of solid electrolytic capacitors A3 at a time, thus improving the production efficiency. Also, the porous sintered bodies 1 can be formed in relatively high density, which is advantageous in increasing the capacitance of the solid electrolytic capacitor A4.

The advantages of the solid electrolytic capacitor A4 will be described below.

In the capacitor A4, direct bonding of the porous sintered bodies 1 to the niobium plate 14 is advantageous in reducing the resistance and inductance at the joint area. Especially, forming the porous compact 1', which constitutes the porous sintered body 1, by a compacting method performed on the plate material 14A assures the secure adhesion of those components. Since the porous sintered body 1 covers the wires 15, the wires 15 can serve to prevent separation of the porous sintered body 1, which makes the solid electrolytic capacitor A4 reliable.

Further, the valve metal such as niobium or tantalum has lower solder-wettability as compared with copper, so that it is not readily soldered to a copper plate. In the capacitor A4, the copper layer 41 is provided on the lower surface of the niobium plate 14, and therefore the niobium plate 14 is securely fixed to the anode metal plate 21 by soldering. Such a feature is also advantageous for reducing the resistance and the inductance of the capacitor A4.

Figure 24:
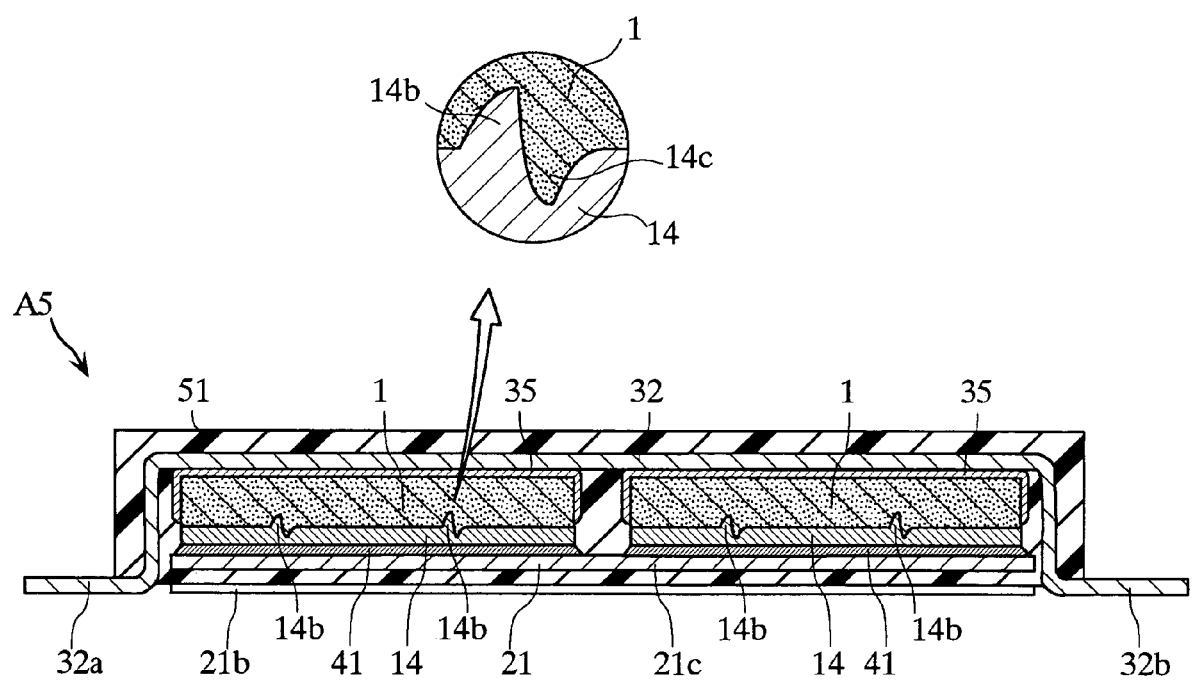
FIG. 24 is a cross-sectional view showing a solid electrolytic capacitor according to a fifth embodiment of the present invention.
Figure 25:
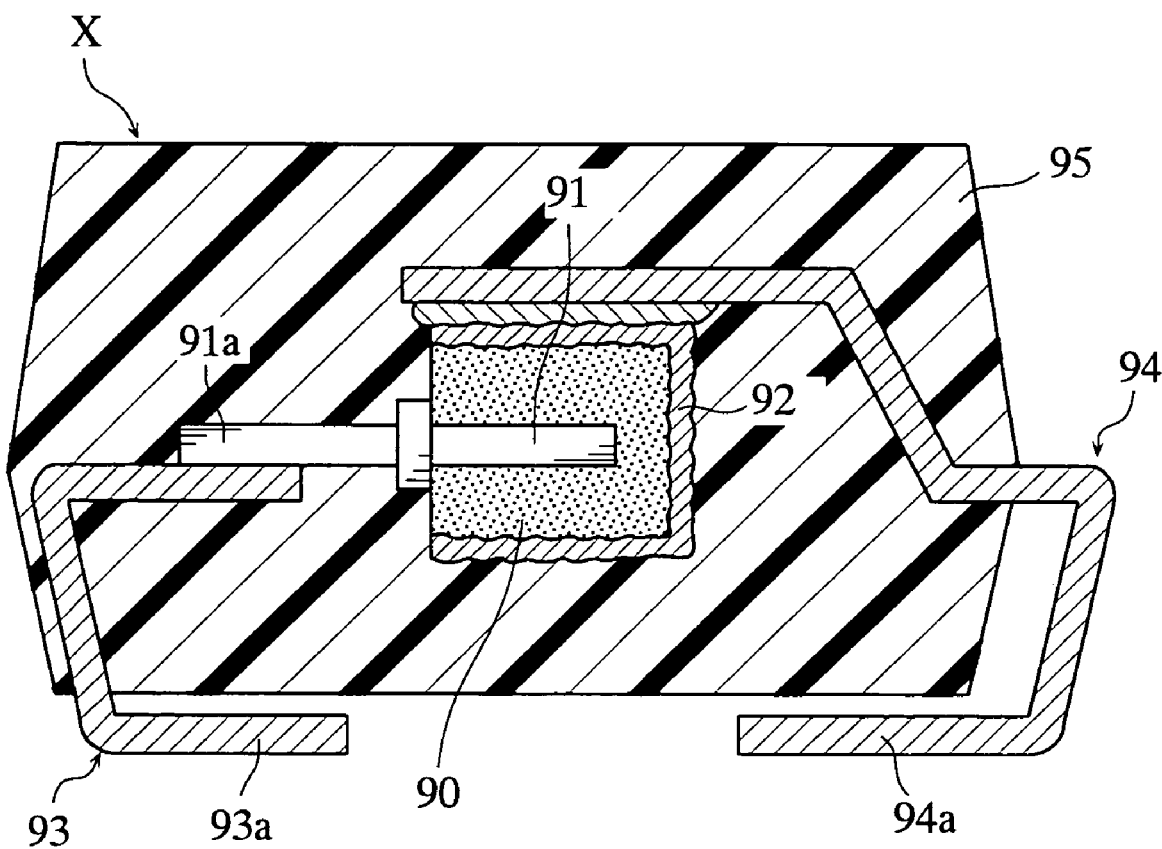
FIG. 25 is a cross-sectional view of a conventional solid electrolytic capacitor.

FIG. 24 depicts a solid electrolytic capacitor according to a fifth embodiment of the present invention. In the solid electrolytic capacitor A5, a plurality of recesses 14c, which give rise to formation of burrs 14b, are formed in the upper surface of the niobium plate 14, and no wires 15 of the solid electrolytic capacitor A4 are provided. The sintered bodies 1 are held in engagement with the burrs 14b and the recesses 14c. This arrangement also serves to prevent the separation of the porous sintered body 1.

The solid electrolytic capacitor according to the present invention is not limited to the foregoing embodiments. The design of the parts constituting the solid electrolytic capacitor of the present invention can be modified in various manners.

The number of porous sintered bodies is not necessarily two, but may be three or more. The number and shape of the internal anode terminals can be modified in various manners without being limited to those of the foregoing embodiments. The capacitor may be a three-terminal type or a lead-through capacitor, other than the foregoing structures.

The porous sintered bodies and the internal anode terminals may be made of any valve metal as cited above. The solid electrolytic capacitor of the present invention is not limited to any particular applications.

The invention claimed is:

1. A solid electrolytic capacitor comprising:
a first sintered body made of a valve metal;
a second sintered body made of a valve metal;
a package that collectively seals the first and the second sintered bodies;
an internal anode terminal electrically connected to each sintered body; and
an external anode terminal electrically connected to the internal anode terminal and exposed from the package;
wherein each of the sintered bodies is flat and includes two principal surfaces;
wherein the first sintered body and the second sintered body are spaced from each other in a predetermined direction perpendicular to a direction in which the two principal surfaces are spaced from each other;
wherein the internal anode terminal includes a first anode rod and a second anode rod, each of the first and second anode rods projecting from each sintered body;
wherein the solid electrolytic capacitor further comprises a conductor that electrically connects the first anode rod and the second anode rod to each other; and
wherein the conductor includes an anode metal plate fixed to a lower surface of each sintered body via an insulator.

2. The solid electrolytic capacitor according to claim 1, further comprising: a dielectric layer and a solid electrolytic layer formed on each sintered body; an internal cathode terminal electrically connected to the solid electrolytic layer; and an external cathode terminal electrically connected to the internal cathode terminal and exposed from the package.

3. The solid electrolytic capacitor according to claim 1, wherein a projecting direction of each of the first anode rod and the second anode rod intersects with the predetermined direction in which the first sintered body and the second sintered body are spaced.

4. The solid electrolytic capacitor according to claim 1, wherein at least part of the anode metal plate constitutes the external anode terminal.

5. The solid electrolytic capacitor according to claim 1, further comprising a cathode metal plate interposed between each sintered body and the insulator, the cathode metal plate including portions that constitute the internal cathode terminal and the external cathode terminal, respectively.

6. A solid electrolytic capacitor comprising:
a first sintered body made of a valve metal;
a second sintered body made of a valve metal;
a package that collectively seals the first and the second sintered bodies;
an internal anode terminal electrically connected to each sintered body; and
an external anode terminal electrically connected to the internal anode terminal and exposed from the package;
wherein each of the sintered bodies is flat and includes two principal surfaces;
wherein the first sintered body and the second sintered body are spaced from each other in a predetermined direction perpendicular to a direction in which the two principal surfaces are spaced from each other;
wherein the internal anode terminal includes a first anode rod and a second anode rod, each of the first and second anode rods projecting from each sintered body;
wherein the first anode rod and the second anode rod are electrically connected to each other via a metal cover that covers at least part of each sintered body.

7. A solid electrolytic capacitor comprising:
a first sintered body made of a valve metal;
a second sintered body made of a valve metal;
a package that collectively seals the first and the second sintered bodies;
an internal anode terminal electrically connected to each sintered body; and
an external anode terminal electrically connected to the internal anode terminal and exposed from the package;
wherein each of the sintered bodies is flat and includes two principal surfaces;
wherein the first sintered body and the second sintered body are spaced from each other in a predetermined direction perpendicular to a direction in which the two principal surfaces are spaced from each other;
wherein the solid electrolytic capacitor further comprises: two metal plates made of a valve metal respectively supporting the first sintered body and the second sintered body; and an anode metal plate to which said two metal plates are connected; and
wherein at least part of the anode metal plate serves as the internal anode terminal.

8. The solid electrolytic capacitor according to claim 7, wherein each of the sintered bodies includes an upper layer portion and a lower layer portion, the upper layer portion being greater in density than the lower layer portion.

9. The solid electrolytic capacitor according to claim 7, wherein at least part of the anode metal plate serves as the external anode terminal.

10. The solid electrolytic capacitor according to claim 7, wherein said two metal plates of the valve metal each are formed, at a lower surface thereof, with a conductor layer having higher solder-wettability than the valve metal, said metal plates of the valve metal being soldered to the anode metal plate.

11. The solid electrolytic capacitor according to claim 7, wherein each sintered body is made of tantalum powder and has a density ranging from 5.5 to 8.0 $g/cm^3$.

12. The solid electrolytic capacitor according to claim 11, wherein the density of each sintered body ranges from 6.0 to 7.0 $g/cm^3$.

13. The solid electrolytic capacitor according to claim 7, wherein each sintered body is formed of a material selected from a group consisting of niobium powder, niobium(II) oxide powder and niobium nitride powder, and has a density ranging from 2.3 to 4.5 $g/cm^3$.

14. The solid electrolytic capacitor according to claim 7, wherein the density of each sintered body ranges from 2.5 to 3.5 $g/cm^3$.

15. The solid electrolytic capacitor according to claim 7, wherein each sintered body is made of tantalum powder, each metal plate being made of tantalum, the powder contained in the paste being tantalum powder.

16. The solid electrolytic capacitor according to claim 7, wherein each sintered body is made of niobium powder, each metal plate being made of niobium, the powder contained in the paste being niobium powder.

17. The solid electrolytic capacitor according to claim 7, wherein each sintered body is made of niobium(II) oxide powder, each metal plate being made of niobium, the powder contained in the paste being one of niobium powder, niobium(II) oxide powder and niobium nitride powder.

18. The solid electrolytic capacitor according to claim 7, wherein the compact is made of niobium nitride powder, the metal plate being made of niobium, and the powder contained in the paste being one of niobium powder, niobium(II) oxide powder and niobium nitride powder.

19. A solid electrolytic capacitor comprising:
a first sintered body made of a valve metal;
a second sintered body made of a valve metal;
a first metal plate made of a valve metal and supporting the first sintered body;
a second metal plate made of a valve metal and supporting the second sintered body;
an anode terminal plate commonly supporting the first and second metal plates; and
a package that collectively seals the first and second sintered bodies together with the first and second metal plates, the anode terminal plate being exposed from the package at least partially;
wherein each of the sintered bodies is flat and includes two principal surfaces;
wherein the first sintered body and the second sintered body are spaced from each other in a predetermined direction perpendicular to a direction in which the two principal surfaces are spaced from each other;
wherein the solid electrolytic capacitor further comprises a wire made of a valve metal, the wire being entirely embedded in each of the first and second sintered bodies and bonded directly to each of the first and second metal plates.

20. A solid electrolytic capacitor comprising:
a first sintered body made of a valve metal;
a second sintered body made of a valve metal;
a first metal plate made of a valve metal and supporting the first sintered body;
a second metal plate made of a valve metal and supporting the second sintered body;
an anode terminal plate commonly supporting the first and second metal plates; and a package that collectively seals the first and second sintered bodies together with the fast and second metal plates, the anode terminal plate being exposed from the package at least partially;

wherein each of the sintered bodies is flat and includes two principal surfaces;

wherein the first sintered body and the second sintered body are spaced from each other in a predetermined direction perpendicular to a direction in which the two principal surfaces are spaced from each other;

wherein each of the first and second metal plates has an inner surface formed with a recess and a projection in contact with a respective one of the first and second sintered bodies.

* * * * *